US009484789B2

(12) United States Patent
Yamada et al.

(10) Patent No.: US 9,484,789 B2
(45) Date of Patent: Nov. 1, 2016

(54) ROTATING ELECTRIC MACHINE

(75) Inventors: Eiji Yamada, Owariasahi (JP); Ryoji Mizutani, Nagoya (JP); Shintaro Chinen, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 346 days.

(21) Appl. No.: 14/359,419

(22) PCT Filed: Nov. 21, 2011

(86) PCT No.: PCT/JP2011/076805
§ 371 (c)(1), (2), (4) Date: Sep. 17, 2014

(87) PCT Pub. No.: WO2013/076791
PCT Pub. Date: May 30, 2013

(65) Prior Publication Data

US 2015/0022035 A1 Jan. 22, 2015

(51) Int. Cl.

| | |
|---|---|
| ***H02K 9/197*** | (2006.01) |
| ***H02K 5/18*** | (2006.01) |
| ***H02K 11/00*** | (2016.01) |
| ***H02K 3/24*** | (2006.01) |
| ***H02K 19/12*** | (2006.01) |
| ***H02K 1/32*** | (2006.01) |
| ***H02K 11/04*** | (2016.01) |
| ***H02K 9/19*** | (2006.01) |
| *H02K 1/24* | (2006.01) |

(Continued)

(52) U.S. Cl.
CPC ................ *H02K 9/197* (2013.01); *H02K 1/32* (2013.01); *H02K 3/24* (2013.01); *H02K 5/18* (2013.01); *H02K 9/19* (2013.01); *H02K 11/042* (2013.01); *H02K 19/12* (2013.01); *H02K 1/24* (2013.01); *H02K 1/28* (2013.01); *H02K 17/26* (2013.01)

(58) Field of Classification Search
CPC .... H02K 11/042; H02K 17/26; H02K 19/12; H02K 1/24; H02K 1/28; H02K 1/32; H02K 3/24; H02K 5/18; H02K 9/19; H02K 9/197; H02K 11/0068
USPC .................................................. 310/54, 68 D
See application file for complete search history.

(56) References Cited

U.S. PATENT DOCUMENTS 3,896,320 A * 7/1975 Moffatt .................... H02K 9/19 310/64
5,319,272 A * 6/1994 Raad .................... H02K 11/042 310/54

(Continued)

FOREIGN PATENT DOCUMENTS

CN 1249558 A 4/2000
GB 2180400 B * 11/1988 ........... H01L 25/074

(Continued)

*Primary Examiner* — Alex W Mok
(74) *Attorney, Agent, or Firm* — Finnegan, Henderson, Farabow, Garrett & Dunner, LLP

(57) ABSTRACT

Provided is a rotating electric machine that is capable of sufficiently cooling, by using a liquid coolant, electronic devices which are attached to a rotor. The rotating electric machine is equipped with: a stator for generating a rotating magnetic field; a rotatable rotor that is installed so as to face the stator; diode devices that are connected to coils wound on the rotor and arranged so as to rotate with the rotor; and a cooling structure for cooling the diode devices by means of a cooling oil which is supplied from the inner side in the radial direction with respect to the diode devices.

10 Claims, 17 Drawing Sheets

16 A 12 10
20u(20v,20w)
30n(30s)
86
90
26a
26b
38(40)
90
14
46
25
COOLING OIL
89
COOLING OIL
24
38(40)
30n(30s)
28n(28s)
A 26a 93 90 28n(28s)
102
94
30n(30s)
100
41
92
95
91
25
89

(51) Int. Cl.
*H02K 1/28* (2006.01)
*H02K 17/26* (2006.01)

(56) References Cited

U.S. PATENT DOCUMENTS

| | | | | |
|---|---|---|---|---|
| 6,191,511 | B1 | 2/2001 | Zysset | |
| 6,218,747 | B1 | 4/2001 | Tsuruhara | |
| 2002/0163274 | A1 | 11/2002 | Kusase et al. | |
| 2009/0184592 | A1* | 7/2009 | Sano et al. | H02K 9/19 310/59 |

FOREIGN PATENT DOCUMENTS

| | | |
|---|---|---|
| JP | 37-29704 | 11/1962 |
| JP | 58-148649 | 9/1983 |
| JP | 58-186776 | 12/1983 |
| JP | 5-29275 | 4/1993 |
| JP | 9-298863 | 11/1997 |
| JP | 2003-23758 | 1/2003 |
| JP | 2009-148047 | 7/2009 |
| JP | 2011-41433 | 2/2011 |
| WO | WO 9013144 A1 * | 11/1990 |

* cited by examiner

ROTATING ELECTRIC MACHINE

CROSS-REFERENCE TO RELATED APPLICATIONS

This application is a national phase application of International Application No. PCT/JP2011/076805, filed Nov. 21, 2011, the content of which is incorporated herein by reference.

TECHNICAL FIELD

The present invention relates to a rotating electric machine having a stator for generating a rotating magnetic field and a rotor having a coil wound therearound.

BACKGROUND ART

Conventionally, Japanese Utility Model Laid-open Publication No. Hei 5-29275 (Patent Document 1) discloses an exciter-incorporating brushless generator that enables collective mounting of an armature of a main exciter, a rotor of a sub-exciter, and a rectifier on a rotation shaft by mounting the armature, the rotor, and the rectifier on a cylindrical holder, and then the holder on the rotation shaft.

Further, Japanese Patent Laid-open Publication No. 2011-41433 (Patent Document 2) discloses a rotating electric machine having a stator for generating a rotating magnetic field as an AC flows in a stator wiring, and a rotor having rotor wirings mounted at a plurality of respective positions thereof in a circumferential direction and a diode for rectifying a current flowing in each rotor wiring.

RELATED ART DOCUMENT

Patent Document

[Patent Document 1] Japanese Utility Model Laid-open Publication No. Hei 5-29275

[Patent Document 2] Japanese Patent Laid-open Publication No. 2011-41433

Problem to be Solved by the Invention

In a rotating electric machine, such as a generator and a motor disclosed in Patent Documents 1 and 2, an electronic device, such as a diode or the like, that rotates together with the rotor generates heat upon application of electricity. Therefore, it is desirable that the electronic device mounted on the rotor is sufficiently cooled by liquid coolant in order to maintain preferable performance of the electronic device.

However, when liquid coolant is supplied to the electronic device on the rotating rotor from the side of the stator mounted outside the rotor in the radial direction so as to surround the rotor, it may not be possible to sufficiently cool the electronic device due to being hindered by a member for holding the electronic device from the outside in the radial direction and/or a centrifugal force caused by the rotor.

An object of the present invention is to provide a rotating electric machine capable of sufficiently cooling an electronic device mounted on a rotor by liquid coolant.

Means to Solve the Problem

A rotating electric machine according to the present invention includes a stator for generating a rotating magnetic field; a rotatable rotor placed opposed to the stator; an electronic device connected to a coil wound around the rotor, for rotating together with the rotor; and a cooling structure for cooling the electronic device with liquid coolant supplied from the inside in a radial direction relative to the electronic device.

In the rotating electric machine according to the present invention, the cooling structure may have a coolant path formed in a shaft for rotatably supporting the rotor and a coolant supply path for supplying the liquid coolant flowing in the coolant path to the outside of the shaft.

In the rotating electric machine according to the present invention, the electronic device may include a plurality of electronic devices placed on an end surface of the rotor in an axial direction at intervals in a circumferential direction, and an end portion of the coolant supply path may be open between the electronic devices in the circumferential direction.

Further, with the rotating electric machine according to the present invention, the electronic device may be mounted on an end plate that constitutes the end surface of the rotor in the axial direction, and the coolant supply path may include a first coolant supply path formed in the shaft and a second coolant supply path formed in the end plate, in which an end portion of the second coolant supply path is open on a surface of the end plate.

Further, with the rotating electric machine according to the present invention, the electronic device may be mounted on an end plate that constitutes an end surface of the rotor in an axial direction, and the coolant supply path may be formed in the shaft to supply the liquid coolant from the coolant path to the outside of the shaft, in which an end portion of the coolant supply path is open on a surface of the shaft.

Further, with the rotating electric machine according to the present invention, the surface of the end plate onto which the liquid coolant is supplied from the coolant supply path may be inclined outward in the axial direction relative to the radial direction.

Further, with the rotating electric machine according to the present invention, the electronic device may be mounted on an end plate that constitutes an end surface of the rotor in an axial direction, and the coolant supply path may continue to an outer circumferential surface of the end plate in a position between the electronic device and the coil via a path formed in the end plate.

In this case, a heat discharge fin may be formed on an inside wall surface of the path on a back surface side of the electronic device.

Further, with the rotating electric machine according to the present invention, the electronic device may be mounted on an end plate that constitutes an end surface: of the rotor in an axial direction, an opening on an end portion of the coolant supply path may be positioned farther inward in the axial direction from an end surface of the end plate in the axial direction, and a cover member for covering at least an outer circumferential portion may be provided to the end surface of the end plate in the axial direction.

In this case, a coolant discharge outlet for regulating the amount of coolant pooled in a coolant sump for pooling the liquid coolant discharged from a coolant discharge outlet and flowing outward in the radial direction may be formed on an outer circumferential portion of the cover member.

Effect of the Invention

According to the rotating electric machine according to the present invention, liquid coolant supplied to an electronic device from the inside relative thereto in the radial direction flows outward in the radial direction due to a centrifugal force or the like caused by the rotating rotor to be supplied to the circumference of the electronic device, so that the electronic device that generates heat upon application of current can be sufficiently cooled.

BEST MODE FOR CARRYING OUT THE INVENTION

Figure 1:
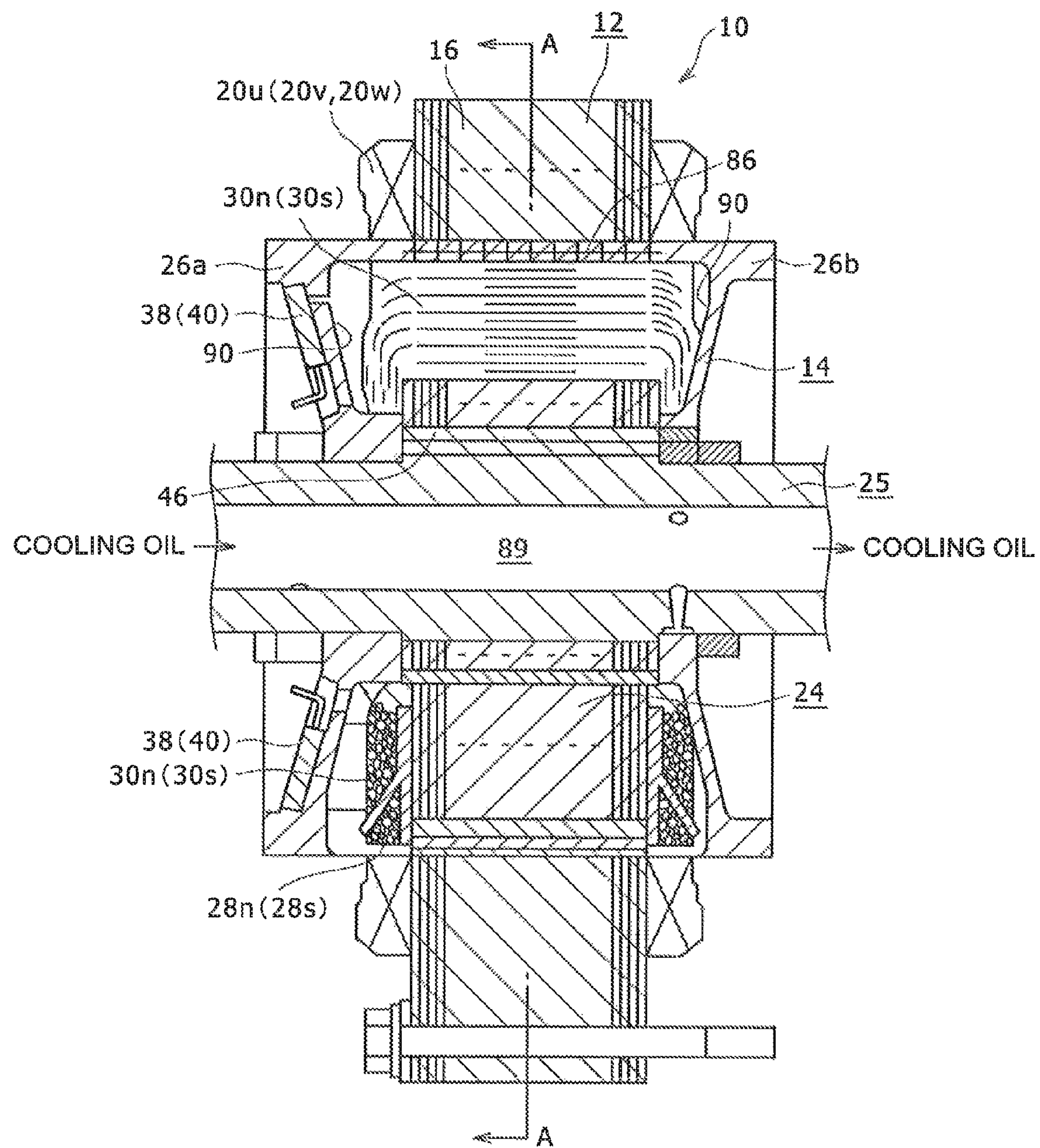
FIG. 1 is a cross sectional view showing a rotating electric machine according to one embodiment of the present invention.

In the following, an embodiment of the present invention will be described using the drawings. FIGS. 1 to 5, 7, and 8 show an embodiment of the present invention. FIG. 1 is a schematic cross sectional view showing a part of a rotating electric machine having a rotating electric machine rotor according to this embodiment. As shown in FIG. 1, a rotating electric machine 10 functions as a motor or a generator, and has a cylindrical stator 12 fixed to a casing (not shown) and a rotor 14 mounted inside in the radial direction relative to the stator 12 at a predetermined space away from the stator 12 so as to be opposed to and rotatable relative to the stator 12. Note that a "radial direction" refers to a radiation direction orthogonal to the rotation center axis of the rotor 14 (which is similarly applied throughout this specification and claims unless stated otherwise).

The stator 12 has a stator core 16 made of magnetic material, and stator coils 20*u*, 20*v*, 20*w* of a plurality of phases (for example, three phases, namely, U-phase, V-phase, W-phase) mounted on the stator core 16. The rotor 14 has a rotor core 21 made of magnetic material, a shaft 25 inserted and fixed at the center of the rotor core 24, and two end plates 26*a*, 26*b* placed on both respective end sides of the rotor core 24 in the axial direction.

The rotor 14 has a plurality of rotor coils, namely, an N-pole induction coil 28*n*, an S-pole induction coil 28*s*, an N-pole common coil 30*n*, and an S-pole common coil 30*s*, mounted on the rotor core 24, a first diode 38 connected to the N-pole induction coil 28*n*, and a second diode 40 connected to the S-pole induction coil 28*s*.

Figure 2:
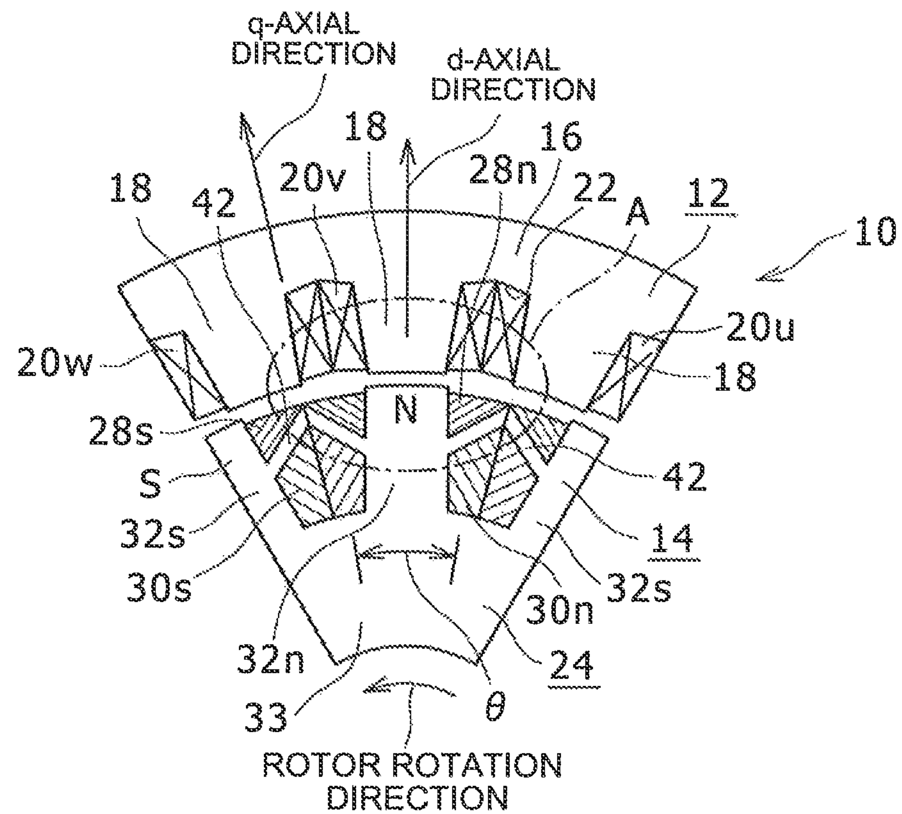
FIG. 2 is a cross sectional view schematically showing a part of a rotor and stator in a circumferential direction in the rotating electric machine in this embodiment.
Figure 3:
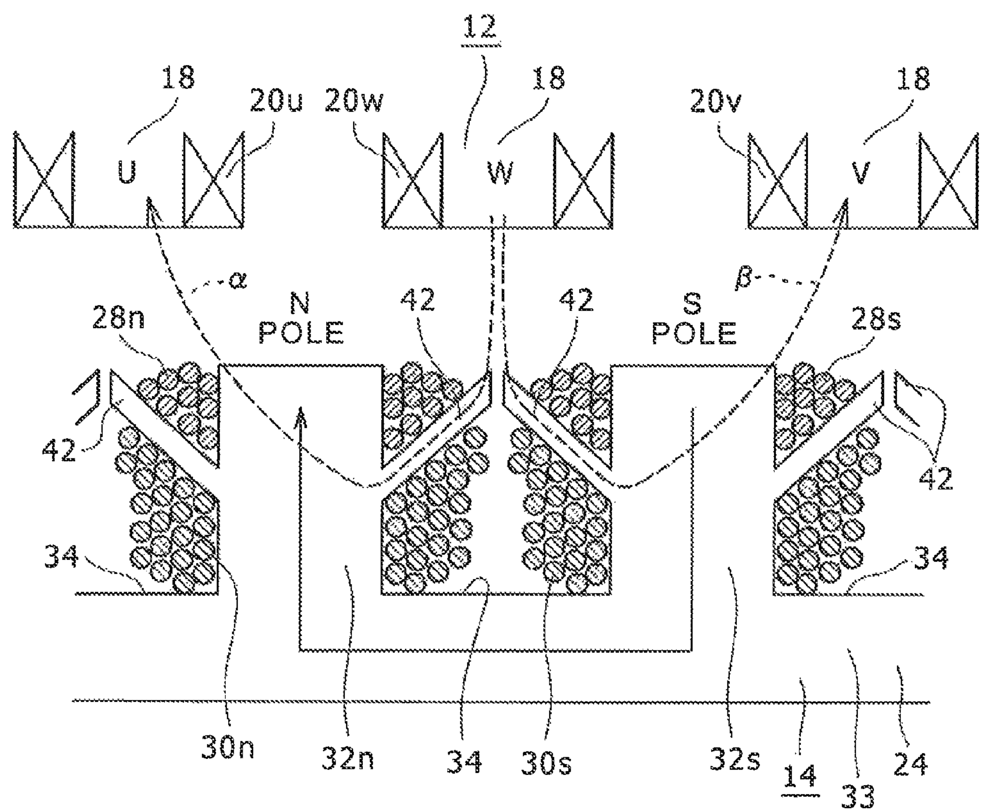
FIG. 3 schematically shows a magnetic flux generated due to induced current flowing in a rotor coil, flowing into the rotor in the rotating electric machine in this embodiment.
Figure 4:
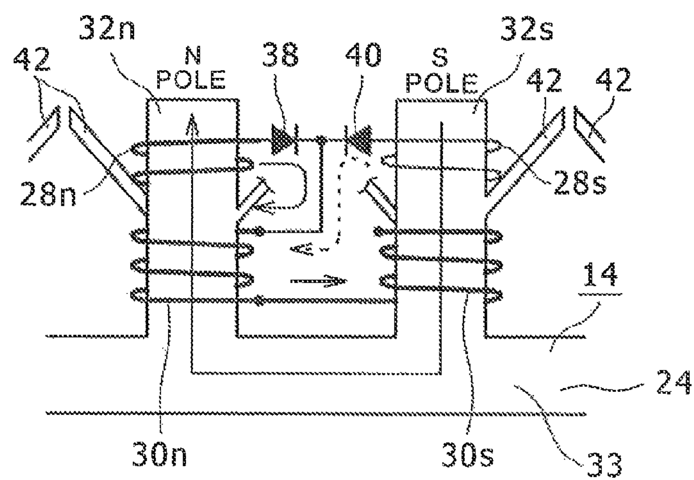
FIG. 4 shows a rotor coil connected to a diode, and is a drawing corresponding to FIG. 3.

Initially, a basic structure of the rotating electric machine 10 will be described, using FIGS. 2 to 5, and a detailed structure of the rotor 14 will be thereafter described. FIG. 2 is a schematic cross sectional view showing a part of the rotor and the stator in the circumferential direction in a rotating electric machine in this embodiment. FIG. 3 is a schematic view showing a magnetic flux generated due to an induced current flowing in the rotor coil and flowing in the rotor in the rotating electric machine in this embodiment. FIG. 4 shows a rotor coil connected to a diode, and is a drawing corresponding to FIG. 3.

As shown in FIG. 2, the stator 12 has a stator core 16. A plurality of teeth 18 are formed at a plurality of respective positions in the circumferential direction on the inner circumferential surface of the stator core 16 so as to project inward in the radial direction (that is, toward the rotor 14), with a slot 22 resultantly formed between the teeth 18. The stator core 16 is made of magnetic material, such as a stacked body of metal sheets, such as electromagnetic steel sheets having magnetism, such as a silicon steel sheet, or the like. The plurality of teeth 18 are equidistantly arranged in the circumferential direction around the rotation center axis, or the rotation axis of the rotor 14. A "circumferential direction" refers to a direction along a circle defined with the rotation center axis of the rotor 14 as the center (which is similarly applicable throughout this specification and claims unless otherwise stated).

The stator coils 20*u*, 20*v*, 20*w* of the respective phases run in the respective slots 22, and are wound around the respective teeth 18 of the stator core 16 in a short-pitch concentrated winding manner. The stator coils 20*u*, 20*v*, 20*w* are wound around the teeth 18, as described above, so that a magnetic pole is formed. Then, by causing AC of a plurality of phases to flow into the stator coils 20*u*, 20*v*, 20*w* of the plurality of phases, the teeth 18 arranged in the circumferential direction are magnetized, whereby a rotating magnetic field that rotates in the circumferential direction is generated in the stator 12.

Note than the stator coils 20*u*, 20*v*, 20*w* are not limited to the above described structure of being wound around the teeth 18 of the stator 12, and may be wound in a toroidal winding manner, for example, in which stator coils of a plurality of phases are wound around an annular portion of the stator core 16, which is apart from the teeth 18, at a plurality of respective positions in the circumferential direction to generate a rotating magnetic field in the stator 12.

The rotating magnetic field generated on the teeth 18 acts on the rotor 14 from the tip end surface of the teeth. In the example shown in FIG. 2, three teeth 18 wound by the respective stator coils 20*u*, 20*v*, 20*w* of three phases (U-phase, V-phase, W-phase) together form one magnetic pole.

Meanwhile, the rotor 14 has a rotor core 24 made of magnetic material and a plurality of rotor coils, namely, an N-pole induction coil 28*n*, an N-pole common coil 30*n*, an S-pole induction coil 28*s*, and an S-pole common coil 30*s*. The rotor core 24 has an N-pole formed salient pole 32*n* and an S-pole formed salient pole 32*s*, which are a plurality of magnetic poles formed on the outer circumferential surface thereof at a plurality of respective positions in the circumferential direction so as to project outward (that is, toward the stator 13) in the radial direction, and are main salient poles.

The N-pole formed salient pole 32*n* and the S-pole formed salient pole 32*s* are arranged alternately at an interval in the circumferential direction of the rotor core 24 so as to be opposed to the stator 12. A rotor yoke 33, or the annular portion of the rotor core 24, and the plurality of salient poles 32*n*, 32*s* are integratedly formed by connecting into an annular shape a plurality of rotor core elements which are each a stacked body formed by stacking magnetic metal sheets in a plurality of layers, which will be described later in detail. The N-pole formed salient pole 32*n* and the S-pole formed salient pole 32*s* have an identical shape and size.

In more detail, two N-pole rotor coils, namely, the N-pole common coil 30*n* and the N-pole induction coil 28*n*, are wound around each of the N-pole formed salient poles 32*n*, or every other salient poles formed on the rotor 14 in the circumferential direction, in the concentrated winding manner. Moreover, in the rotor 14, two S-pole rotor coils, namely, the S-pole common coil 30*s* and the S-pole induction coil 28*s*, are wound around each of the S-pole formed salient poles 32*s*, or every other salient pole formed on the rotor 14 in the circumferential direction adjacent to the respective N-pole formed salient poles 32*n*, in the concentrated winding manner. In view of the radial direction of the rotor 14, the respective common coils 30*n*, 30*s* are inside coils, while the respective pole induction coils 28*n*, 28*s* are outside coils.

As shown in FIG. 3, the rotor 14 has a slot 34 defined between the adjacent salient poles 32*n*, 32*s* in the circumferential direction. That is, a plurality of slots 34 are formed at intervals on the rotor core 24 in the circumferential direction around the rotation axis of the rotor 14. The rotor core 24 is fit and fixed outside in the radial direction relative to the shaft 25 (see FIG. 1), which serves as the rotation axis.

Each N-pole induction coil 28*n* is wound around each N-pole formed salient pole 32*n* on a side closer to the tip end thereof, that is, on a side closer to the stator 12, than the N-pole common coil 30*n*. Meanwhile, the S-pole induction coil 28*s* is wound around each S-pole formed salient pole 32*s* on a side closer to the tip end thereof, that is, on a side closer to the stator 12, than the S-pole common coil 30*s*.

Note that, as shown in FIG. 3, the induction coils 28*n*, 28*s* and the common coils 30*n*, 30*s* to be wound around the respective salient poles 32*n*, 32*s* may be wound in a regular winding manner in which solenoids placed along the length direction (the up-down direction in FIG. 3) in the radial direction of the salient pole 32*n* (or 32*s*) are arranged in a plurality of layers in the circumferential direction (the left-right direction in FIG. 3) of the salient pole 32*n* (or 32*s*). Further, the induction coils 28*n*, 28*s* to be wound around the respective salient poles 32*n*, 32*s* on a tip end side may be wound into a swirl around the respective salient poles 32*n*, 32*s* a plurality of times, or for a plurality of turns.

Figure 5:
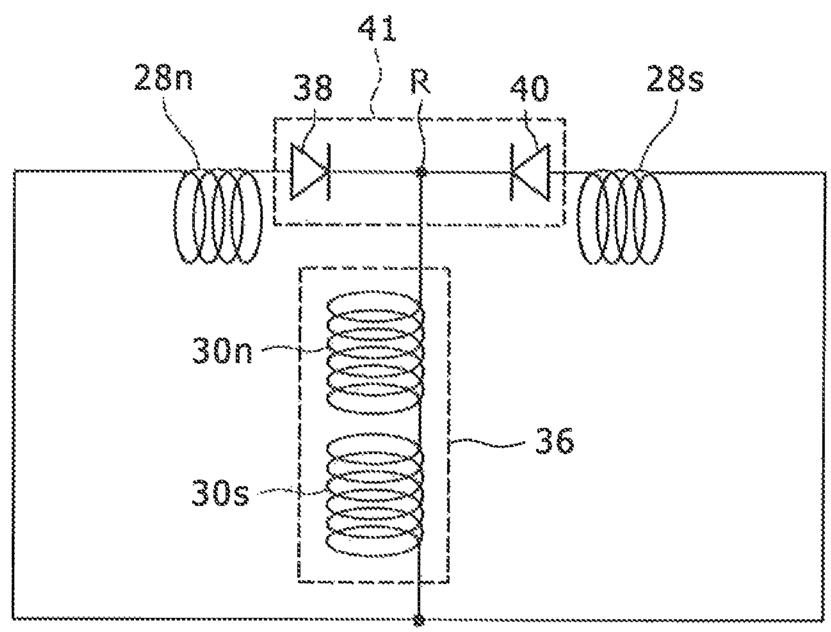
FIG. 5 shows an equivalent circuit of a connection circuit of a plurality of coils wound around two salient poles adjacent in the circumferential direction of the rotor in this embodiment.

As shown in FIGS. 4 and 5, assuming that two adjacent salient poles 32*n*, 32*s* in the circumferential direction of the rotor 14 make a pair, one end portion of the N-pole induction coil 28*n* wound around one N-pole formed salient pole 32*n* in each pair and one end portion of the S-pole induction coil 28*s* wound around the S-pole formed salient pole 32*s* in that pair are connected so each other via two electronic devices that are rectifying elements, namely, a first diode 38 and a second diode 40. FIG. 5 shows an equivalent circuit of a connection circuit of the plurality of coils 28*n*, 28*s*, 30*n*, 30*s* wound around two adjacent salient poles 32*n*, 32*s* in the circumferential direction of the rotor 14 in this embodiment. As shown in FIG. 5, one end portions of the N-pole induction coil 28*n* and of the S-pole induction coil 28*s* are connected to each other at a connection point R via the first diode 38 and the second diode 40, respectively, of which forward directions are opposite from each other. Note that a diode device 41 formed by integrating the first and second diodes 38, 40 in a single resin mold package, to be described later, is used in this embodiment.

Although a case in which an electronic device connected to the coils 28*n*, 28*s*, 30*n*, 30*s* wound around the rotor core 24 is a diode is described in this embodiment, this is not limiting. The electronic device may be a rectifier (for example, a thyristor, a transistor, or the like) having a function for rectifying a current flowing in a coil, or an electronic device, such as a resistor, capacitor, or the like, may be used together with a rectifier, such as a diode or the like.

As shown in FIGS. 4 and 5, one end portion of the N-pole common coil 30*n* wound around the N-pole formed salient pole 32*n* in each pair is connected to one end portion of the S-pole common coil 30*s* wound around the S-pole formed salient pole 32*s* in that pair. The N-pole common coil 30*n* and the S-pole common coil 30*s* are aerially connected to each other, thereby constituting a common coil set 36. Further, the other end portion of the N-pole common coil 30*n* is connected to the connection point R, and the other end portion of the S-pole common coil 30*s* is connected to the other end portions of the N-pole induction coil 28*n* and the S-pole induction coil 28*s* on the opposite side from the connection point R. The winding center axis of each of the induction coils 28*n*, 28*s* and the common coils 30*n*, 30*s* coincides with the radial direction of the rotor 14 (FIG. 2). Note that each of the induction coils 28*n*, 28*s* and the common coils 30*n*, 30*s* can be wound around a corresponding salient pole 32*n* (or 32*s*) via an insulator (not shown) made of resin or the like and having an electrically insulating property.

In such a structure, a rectified current flows into the N-pole induction coil 28*n*, the S-pole induction coil 28*s*, the N-pole common coil 30*n*, and the S-pole common coil 30*s*, whereby the respective salient poles 32*n*, 32*s* are magnified and function as a magnetic pole. Returning to FIG. 3, the stator 12 generates a rotating magnetic field due to an AC flowing in the stator coils 20*u*, 20*v*, 20*w*, in which the rotating magnetic field contains not only a magnetic field comprising a basic wave component but also a magnetic field comprising a harmonic component at a higher order than a basic wave.

In more detail, distribution of a magnetomotive force that generates a rotating magnetic field in the stator 12 does not show a sine wave distribution (containing a basic wave alone) due to the disposition of the stator coils 20$u$, 20$v$, 20$w$ of the respective phases and the shape of the stator core 16 defined by the teeth 18 and the slots 22 (FIG. 2), but shows a distribution containing a harmonic component. In particular, with concentrated winding, the amplitude level of a harmonic component generated in the magnetomotive force distribution of the stator 12 increases because the stator coils 20$u$, 20$v$, 20$w$ of the respective phases do not overlap with each other. For example, in a case of the stator coils 20$u$, 20$v$, 20$w$ in three-phase concentrated winding, the amplitude level of a harmonic component, that is a temporal third-order component of an input electric frequency and also a spatial second-order component, increases. A harmonic component generated in a magnetomotive force due to the disposition of the stator coils 20$u$, 20$v$, 20$w$ and the shape of the stator core 16 is referred to as a spatial harmonic wave.

When the rotating magnetic field containing a spatial harmonic component acts on the rotor 14 from the stator 12, a leakage magnetic flux leaking into the space between the salient poles 32$n$, 32$s$ of the rotor 14 varies due to variation of the magnetic flux of the spatial harmonic. With the above, an induced electromotive force is generated in at least either of the induction coil 28$n$ or the induction coil 28$s$ shown in FIG. 3.

The induction coil 28$n$, 28$s$ mounted on the tip end side of the salient pole 32$n$, 32$s$, positioned closer to the stator 12, mainly has a function for generating an induced current. Meanwhile, the common coil 30$n$, 30$s$ mounted on a side farther from the stator 12 mainly has a function for magnetizing the salient pole 32$n$, 32$s$. As known from the equivalent circuit shown in FIG. 5, the sum of the current flowing in the induction coils 28$n$, 28$s$ wound around the adjacent respective salient poles 32$n$, 32$s$ (see FIGS. 2 to 4) makes a current flowing in each of the common coils 30$n$, 32$s$. As the adjacent common coils 30$n$, 30$s$ are serially connected, it is possible to produce the some effect as that which would be obtained when an increased number of windings are used. This makes it possible to reduce the amount of current flowing in each of the common coils 30$n$, 30$s$, while maintaining the magnetic flux flowing in each of the salient poles 32$n$, 32$s$ unchanged.

When an induced electromotive force is generated in each induction coil 28$n$, 28$s$, a DC in accordance with the rectification direction of each diode 38, 40 flows into the N-pole induction coil 28$n$, the S-pole induction coil 28$s$, the N-pole common coil 30$n$, and the S-pole common coil 30$s$, whereby the salient pole 32$n$, 32$s$ wound by the common coil 30$n$, 30$s$ is magnetized. As a result, the salient pole 32$n$, 32$s$ functions as a magnetic pole, or an electromagnet having a magnetic pole fixed.

As shown in FIG. 4, the N-pole induction coil 28$n$ and the N-pole common coil 30$n$ and the S-pole induction coil 28$s$ and the S-pole common coil 30$s$, adjacent to each other in the circumferential direction, are opposite in the winding direction, and therefore, the adjacent salient poles 32$n$ and 32$s$ in the circumferential direction are opposite in the magnetization direction. In the example shown, an N pole is generated at the tip end of the salient pole 32$n$ wound by the N-pole induction coil 28$n$ and the N-pole common coil 30$n$, and an S pole is generated at the tip end of the S-pole formed salient pole 32$s$ wound by the S-pole induction coil 28$s$ and the S-pole common coil 30$s$. Therefore, an N pole and an S pole are alternately placed in the circumferential direction of the rotor 14. That is, the rotor 14 is formed such that an N pole and an S pole are alternately formed in the circumferential direction thereof as the harmonic component contained in the magnetic field generated in the stator 12 intersects.

In this embodiment, the rotor 14 includes an auxiliary salient pole 42 projecting from each of the two lateral surfaces in the circumferential direction of each of the salient poles 32$n$, 32$s$ arranged at a plurality of respective positions in the circumferential direction. The auxiliary salient pole 42 is a magnetic plate formed on each of the two lateral surfaces of each salient pole 32$n$, 32$s$ in the circumferential direction (the left-right direction in FIGS. 3, 4) so as to project from each of a plurality of positions in the axial direction (from the front to rear surfaces of FIGS. 3 and 4) in a direction inclined relative to the circumferential direction. For example, in the example shown, the auxiliary salient pole 42 is formed in a middle portion in the radial direction on each of the two lateral surfaces of each salient pole 32$n$, 32$s$ in the circumferential direction so as to be inclined relative to the circumferential direction so as to be more outward in the radial direction as it goes toward the tip end thereof. A plurality of auxiliary salient poles 42 project from between the N-pole induction coil 28$n$ and the N-pole common coil 30$n$ and also between the S-pole induction coil 28$s$ and the S-pole common coil 30$s$ on each of the two lateral surfaces of each salient pole 32$n$, 32$s$ in the circumferential direction. That is, the auxiliary salient pole 42 is magnetically connected to a corresponding salient pole 32$n$, 32$s$ at the root portion thereof.

A plurality of auxiliary salient poles 42 projecting from the respective opposed salient poles 32$n$, 32$s$ in the same slot 34 may or may not be mechanically connected to each other. In FIGS. 3 and 4, the auxiliary salient pole 42 of the N-pole formed salient pole 32$n$ and the auxiliary salient pole 42 of the S-pole formed salient pole 32$s$ arranged in the same slot 34 are not mechanically connected to each other. That is, FIGS. 3 and 4 schematically show the auxiliary salient poles 42 in magnetic disconnection. The auxiliary salient pole 42 is made of the same magnetic material as that of the salient pole 32$n$, 32$s$.

The induction coil 28$n$ (or 28$s$) and the common coil 30$n$ (or 30$s$) wound around each salient pole 32$n$ (or 32$s$) are separated from each other by the auxiliary salient pole 42 in a corresponding slot 34. That is, the induction coils 28$n$, 28$s$ and the common coils 30$n$, 30$s$ wound around the same respective salient poles 32, 32$s$ are connected to each other at a position or positions apart from the auxiliary salient poles 42, such as, on one or both coil end sides (not shown) or the like, more outward than the end surface of the rotor core 24 in the axial direction.

Figure 8:
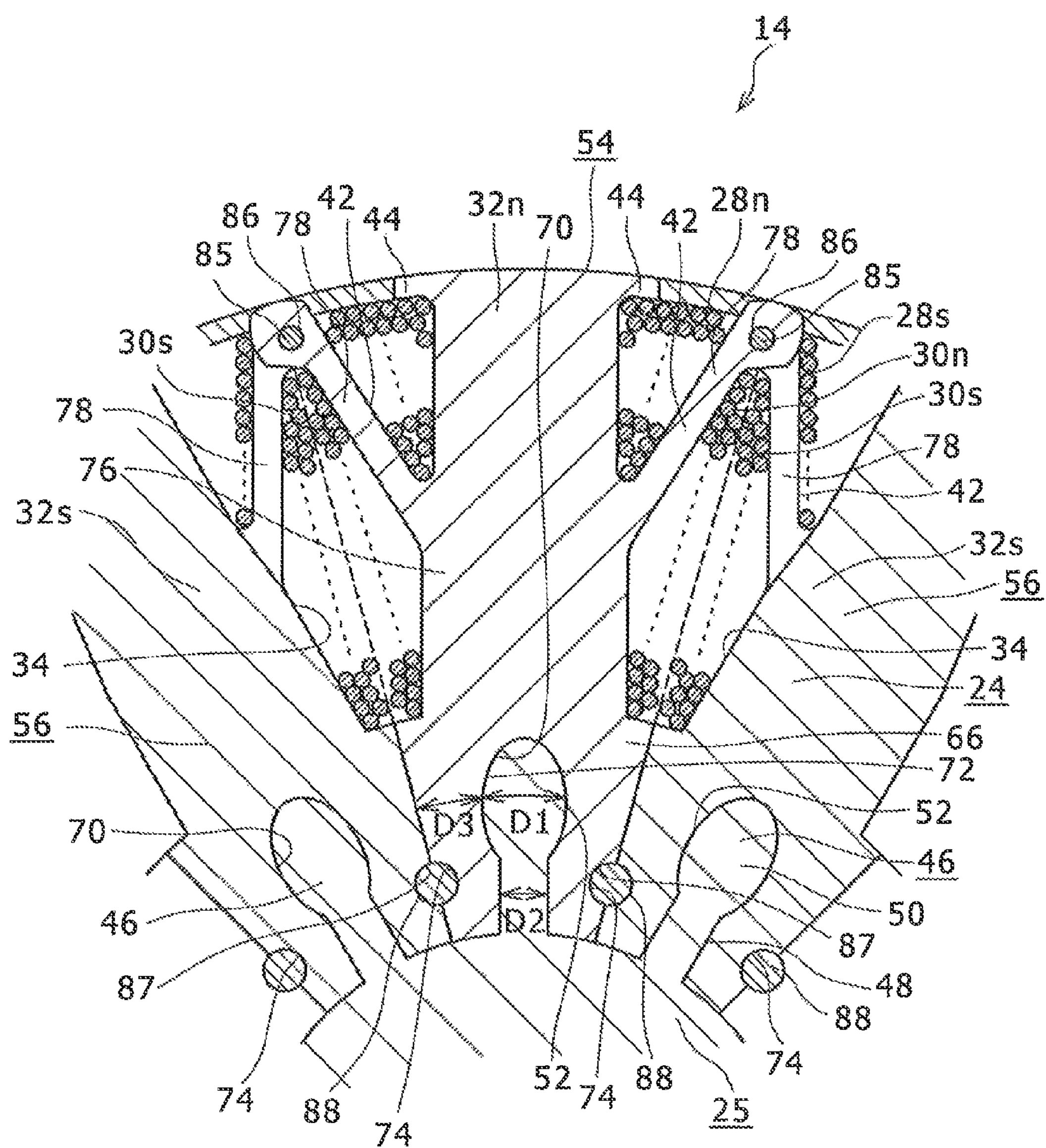
FIG. 8 is an enlarged view of the part B in FIG. 7.

As shown in FIG. 8 to be described later, a brim portion 44 for preventing removal of the inductance coils 28$n$, 28$s$ may be formed on the tip end portion of each salient pole 32$n$ (similar with 32$s$) so as to project in the two respective sides in the circumferential direction. The brim portion 44, however, is omissible.

In the rotating electric machine 10 having the rotor 14 (FIG. 2), a rotating magnetic field (basic wave component) generated on the teeth 18 (FIG. 2) due to an AC of three phases flowing in the stator coils 20$u$, 20$v$, 20$w$ of three phases acts on the rotor 14, and the salient poles 32$n$, 32$s$ are thereupon attracted to the rotating magnetic field generated on the teeth 18 such that magnetic resistance of the rotor 14 becomes smaller. This makes a torque (reluctance torque) act on the rotor 14.

When the rotating magnetic field containing a spatial harmonic component generated on the teeth 18 links with each induction coil 28$n$, 28$s$ of the rotor 14, an induced electromotive force is generated in the induction coil 28*n*, 28*s* due to variation of a magnetic flux at a frequency different from the rotation frequency (basic wave component of the rotating magnetic field) of the rotor 14 due to the spatial harmonic component. A current flowing into each induction coil 28*n*, 28*s* upon generation of the induced electromotive force is rectified by the respective diode 38, 40, to thereby flow in one direction (DC).

The DC current rectified in each diode 38, 40 flows into the induction coil 28*n*, 28*s* and the common coil 30*n*, 30*s*, whereby the salient pole 32*n*, 32*s* is magnetized to function as a magnet having a magnetic pole fixed (to either N pole or S pole). As the rectification directions of the currents flowing in the respective induction coils 28*n*, 28*s*, defined by the diodes 38, 40, are opposite from each other, as described above, the magnets caused ac the respective salient poles 32*n*, 32*s* are such that an N pole and an S pole are alternately arranged in the circumferential direction.

Moreover, as the auxiliary salient pole 42 is formed on each of the two lateral surfaces of each salient pole 32*n*, 32*s* in the circumferential direction so as to be inclined relative to the circumferential direction so as to be positioned more outward in the radial direction as it goes toward the tip end thereof, as shown in FIG. 3, when a case is assumed in which a q-axial magnetic flux, or a magnetic flux of a spatial second-order spatial harmonic, flows as a magnetomotive force of the stator 12 from the stator 12 to the rotor 14 in the directions indicated by the broken arrows α, β in FIG. 3, for example, it is possible, with the auxiliary salient pole 42, to have many magnetic fluxes link with the induction coils 28*n*, 28*s*. That is, there is a case in which many of spatial harmonic q-axial magnetic fluxes are induced from some teeth 18 of the stator 12 to some salient pores 32*n*, 32*s* via some auxiliary salient poles 42 and further from some salient poles 32*n*, 32*s* to other teeth 1 under some positional relationship between the stator 12 and the rotor 14, and therefore, it is possible to have many magnetic fluxes link with the induction coils 28*n*, 28*s*.

While the direction and size of the q-axial magnetic flux vary during one electric cycle, it is possible to enlarge variation of the interlinkage magnetic flux of the inductance coil 28*n*, 28*s* by increasing the maximum amount of the magnetic flux flowing in the induction coil 28*n*, 28*s*. For example, there is a case in which a q-axial magnetic flux flows from the teeth 18 of the stator 12 via the S-pole auxiliary salient pole 42 to the S-pole formed salient pole 32*s*, as indicated by the broken arrow β in FIG. 3, and a magnetic flax tends to flow in such a direction that makes the S-pole formed salient pole 32*s* become an N pole. In this case, an induced current tends to flow into the S-pole induction coil 28*s* in such a direction that blocks that flow, and the flow of the induced current is not blocked by the second diode 40 (see FIG. 4). That is, as indicated by the solid arrow in FIG. 3, a magnetic flux due to an induced current, directed front the S-pole formed salient pole 32*s* via the rotor yoke 33 of the rotor core 24 to the N-pole formed salient pole 32*n*, flows.

Meanwhile, there is a case in which a q-axial magnetic flux flows opposite from the above, that is, in an opposite direction from the direction indicated by the broken arrow α in FIG. 3, that is, from the teeth 18 of the stator 12 via the N-pole formed salient pole 32*n* to the auxiliary salient pole 42, and a magnetic flux tends to flow in such a direction that mates the N-pole formed salient pole 32*n* become an S pole. In this case, an induced current tends to flow into the N-pole induction coils 28*n* in such a direction that blocks that flow. That flow of the induced current is not blocked by the first diode 38 (see FIG. 4), and causes a current to flow in such a direction that makes the N-pole formed salient pole 32*n* become an N pole. In this case as well, a magnetic flux due to an induced current, directed from the S-pole formed salient pole 32*s* via the rotor yoke 33 to the N-pole formed salient pole 32*n*, flows. As a result, each salient pole 32*n* is magnetized into an N pole and each salient pole 32*s* is magnetized into an S pole.

As the auxiliary salient pole 42 projects from each of the two lateral surfaces of each salient pole 32*n*, 32*s*, as described above, it is possible to enlarge the maximum amplitude of a magnetic flux that links with each induction coil 28*n*, 28, and thus to enlarge variation of the interlinkage magnetic flux, compared to a case where there is no auxiliary salient pole 42, that is, a case in which there is only a space between the adjacent salient poles 32*n*, 32*s* in the circumferential direction in each slot 34.

A magnetic field of each salient pole 32*n*, 32*s* (a magnet having a magnetic pole fixed) reacts with the rotating magnetic field (basic wave component) generated by the stator 12, whereby attraction and repulsion are caused. It is possible to have a torque (a torque corresponding to a magnetic torque) act on the rotor 14 through electromagnetic mutual reaction (attraction and repulsion) between the rotating magnetic field (basic wave component) generated by the stator 12 and the magnetic field of the salient pole 32*n*, 32*s* (magnet) as well, and the rotor 14 rotates in synchronism with the rotating magnetic field (basic wave component) generated by the stator 12. In this manner, the rotating electric machine 10 can cause the rotor 14 to function as a motor for generating a driving force (mechanical driving force), utilizing power supplied to the stator coils 20*u*, 20*v*, 20*w*.

Figure 6:
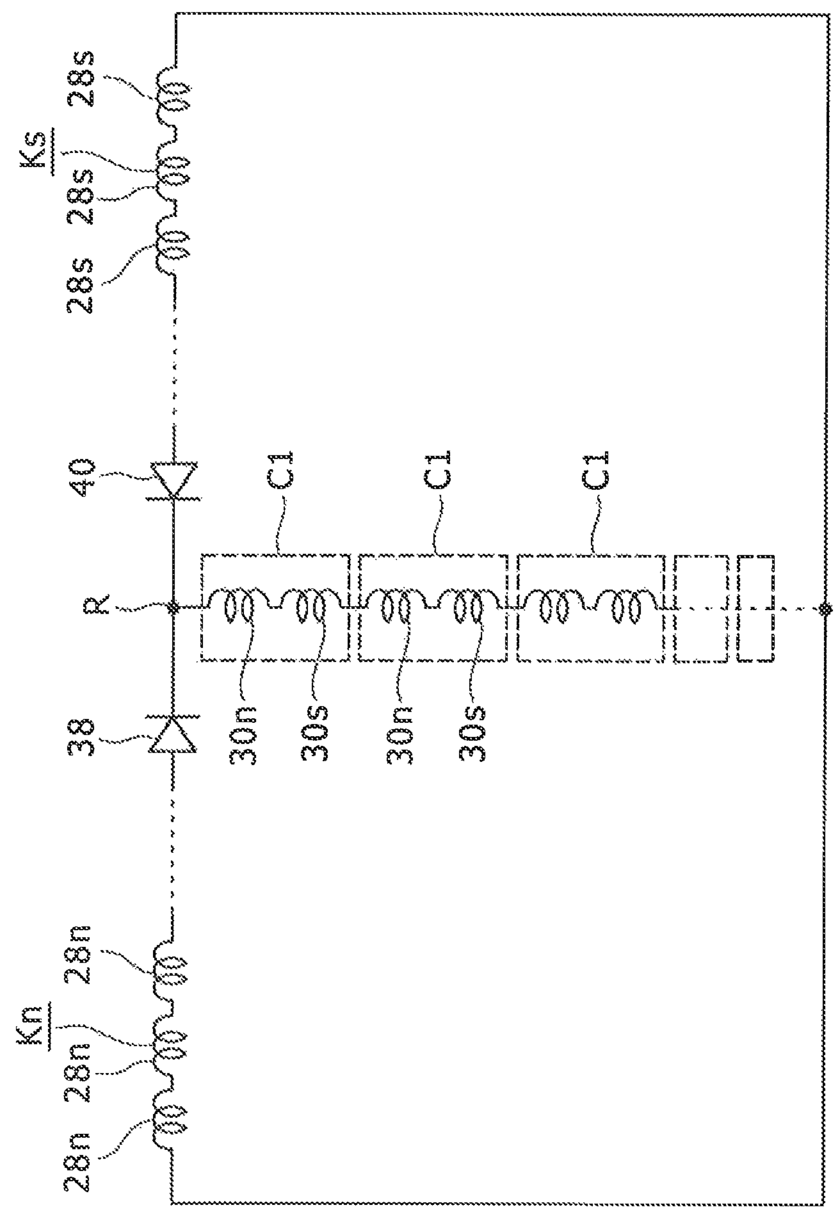
FIG. 6 shows an example in which fewer diodes are connected to the rotor coil, and is a drawing corresponding to FIG. 5.

In this embodiment, a case is described in which two adjacent salient poles 32*n*, 32*s* make a pair and the induction coils 28*n*, 28*s* wound around the two respective salient poles 32*n*, 32*s* in each pair are connected to each other via the two diodes 38, 40. Therefore, two diodes 38, 40 are necessary for two salient poles 32*n*, 32*s*. Meanwhile, a structure is applicable in which all induction coils 28*n*, 28*s*, 30*n*, 30*s* wound around all respective salient poles 32*n*, 32*s* of the rotor 14 are connected to one another, and only two diodes 38, 40 are used. FIG. 6 shows a modified example in which the number of diodes connected to the rotor coils is reduced, and is a drawing corresponding to FIG. 5.

In the modified example shown in FIG. 6, the plurality of N-pole induction coils 28*n* wound around every other respective salient pole arranged in the circumferential direction of the rotor, namely, all N-pole formed salient poles 32*n* (see FIG. 3), on the tip end side thereof are serially connected to each other in the structure shown in FIGS. 3 and 4, to thereby form an N-pole induction coil group Kn, while the plurality of S-pole induction coils 28*s* wound around every other respective salient pole arranged in the circumferential direction of the rotor, namely, all S-pole formed salient poles 32*s* (see FIG. 3), on the tip end side thereof are serially connected to each other, to thereby form an S-pole induction coil group Ks. One end portion of the N-pole induction coil group Kn is connected to one end portion of the S-pole induction coil group Ks at a connection point R via the first diode 38 and the second diode 40, respectively, of which forward directions are opposite to each other.

In a case where two adjacent salient poles in the circumferential direction of the rotor, namely, the N-pole formed salient pole 32*n* and S-pole formed salient pole 32*s* (see FIG. 3), make one pair, the N-pole common coil 30*n* and the S-pole common coil 30*s* in each pair are serially connected to each other, to thereby form a common coil pair C1, and all common coil pairs C1 relevant to all respective salient poles 32*n*, 32*s* are serially connected to each other. Moreover, one end portion of the N-pole common coil 30*n* of one of the serially connected plurality of common coil pairs C1, the end portion constituting one end portion of the serial connection, is connected to the connection point R, and one end portion of the S-pole common coil 30*s* of another common coil pair C1, the end portion constituting the other end portion of the serial connection, is connected to the other ends of the N-pole induction coil group Kn and of the S-pole induction coil group Ks, opposite from the connection point R. In this structure, different from the structure shown in FIGS. 4 and 5, the total number of diodes mounted on the rotor can be reduced to two, that is, the first diode 38 and the second diode 40, which can reduce costs and the number of assembly steps.

The above described is a basic structure of the rotating electric machine 10 having the rotor 11 in this embodiment, and an effect thereof. In this embodiment, a structure including a plurality of rotor core elements arranged at a plurality of respective positions in the circumferential direction is employed as the rotor 14, and moreover, a specific structure described below is also employed in order to reduce magnetic resistance in a magnetic path in which many magnetic fluxes generated in the stator 12 run and also to improve performance of the rotating electric machine 10. Below, a specific structure of the rotor 14 will be described, referring to FIGS. 7 and 8, in which elements similar to those shown in FIGS. 1 to 6 are given the same reference numerals.

Figure 7:
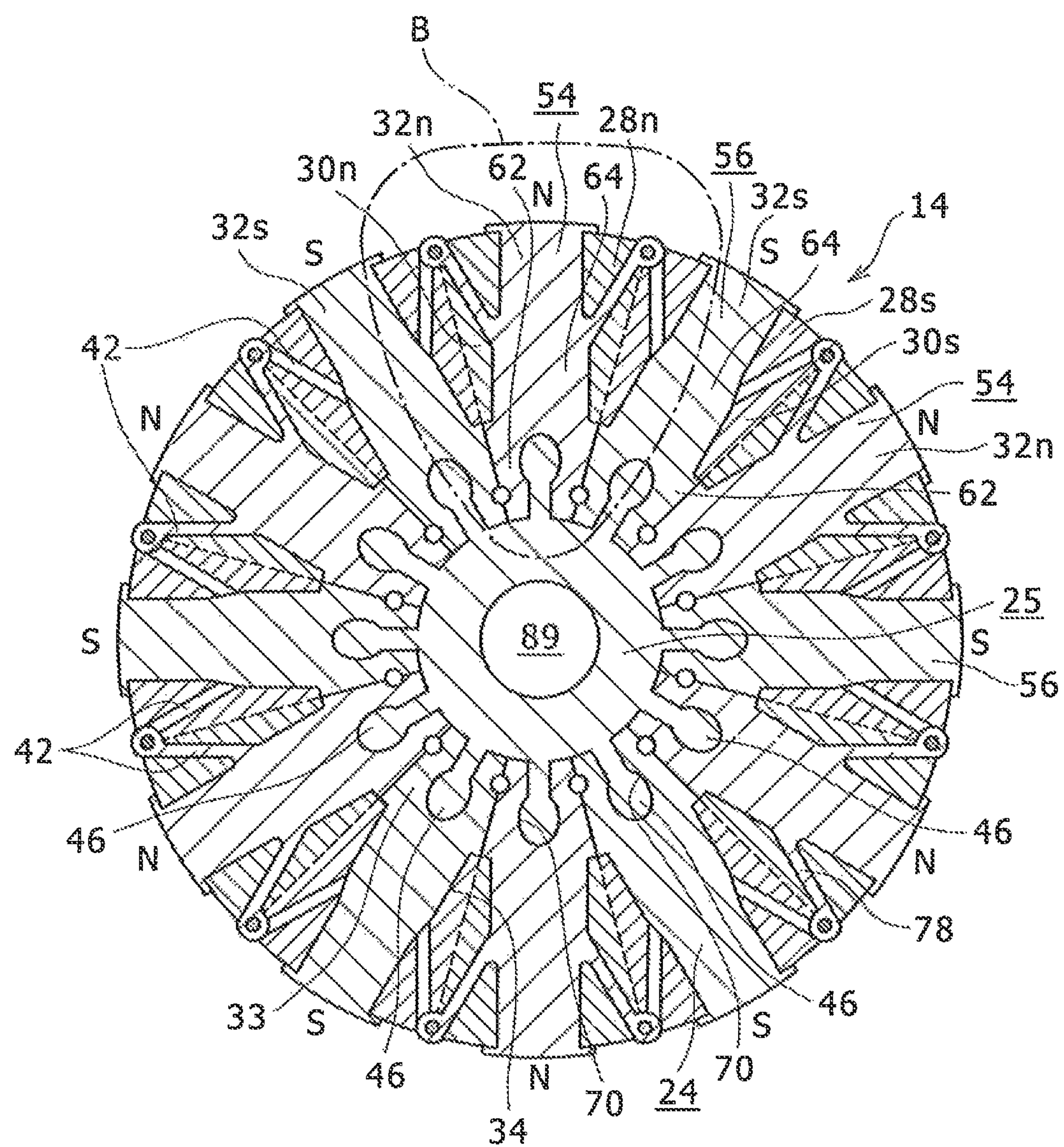
FIG. 7 is a cross sectional view along the line A-A in the rotor shown in FIG. 1.

FIG. 7 is a cross sectional view of the rotor 14 along the line A-A in FIG. 1. FIG. 8 is an enlarged view of the part B in FIG. 7. As shown in FIG. 7, the rotor 14 in this embodiment has the rotor core 24 and the shaft 25 fitted and fixed at the center of the rotor core 24.

The shaft 25 has a plurality of outside convex portions 46 formed at a plurality of respective positions in the circumferential direction on the outer circumferential surface thereof so as to project in the radial direction. As shown in FIG. 8, all outside convex portion 46 have the same shape in a cross section orthogonal to the axial direction and long in the axial direction. That is, each outside convex portion 46 has a shaft-side root portion 48 having a smaller width in the circumferential direction and a shaft-side tip end portion 50 connected to the shaft-side root portion 48 and having a larger width in the circumferential direction than the width of the shaft-side root portion 48 in the circumferential direction. The shaft-side tip end portion 50 has a substantially oval cross section. The shaft-side tip end portion 50 has a widest portion 52 having the maximum width in the circumferential direction, in which the width D1 of the widest portion 52 in the circumferential direction is larger than the maximum width D2 of the shaft-side root portion 48 in the circumferential direction. The shaft 25 is made of highly rigid material, such as steel material containing no silicon.

Returning to FIG. 7, the rotor core 24 has a plurality of rotor core elements, namely, a plurality of first core elements 54 and a plurality of second core elements 56. Specifically, the rotor core 24 is formed by placing the first core elements 54 and the second core elements 56 alternately one by one in the circumferential direction, and then connecting into an annular shape.

Each core element 54, 56 is made by stacking magnetic metal sheets, such as an electromagnetic steel sheet, or the like, such as a silicon steel sheet. Each core element 54, 56 has a rotor-side root portion 62 positioned on the side for connection to the shaft 25 and a rotor-side tip end portion 64 connected outside the rotor-side root portion 62 in the radial direction. The rotor-side root portion 62 constitutes the rotor yoke 33, and the rotor-side tip end portion 64 constitutes the N-pole formed salient pole 32*n* or the S-pole formed salient pole 32*s*.

In the rotor-side root portion 62 an inside concave portion 70 is formed so as to concave outward in the radial direction. The outside convex portion 46 formed on the shaft 25 is fitted into the inside concave portion 70 in the axial direction. The inside concave portion 70 is formed on each core element 54, 56 so as to be open inward in the radial direction, and has a wider portion 72 having a wider width in the circumferential direction formed on the side opposite from the opening. The two lateral surfaces of the rotor-side root portion 62 in the circumferential direction coincide with the radial direction of the rotor 14. A half round portion 74 is formed on each of the both lateral surfaces of the rotor-side root portion 62 in the circumferential direction at a position more inward in the radial direction than a position with the maximum width of the inside concave portion 70 in the circumferential direction.

The rotor-side tip end portion 64 has a diagonally projecting portion 78 that projects from each of the two lateral surfaces thereof in the circumferential direction so as to be inclined relative to the circumferential direction. Each diagonally projecting portion 78 constitutes the auxiliary salient pole 42 mentioned above (FIG. 2 or the like). A pin hole 85 is formed on a tip end portion of each diagonally projecting portion 78 so as to penetrate in the axial direction. A circumferential projecting portion 80 is formed on each of the two lateral surfaces in the circumferential direction of the tip end portion of the rotor-side tip end portion 64 for formation of the brim portion 44 (see FIG. 8).

In each core element 54, 56, the induction coil 28*n* (or 28*s*) is wound on the outer side of the diagonally projecting portion 78 in the radial direction, and the common coil 30*n* (or 30*s*) is wound on the inner side of the diagonally projecting portion 78 in the radial direction. Each coil 28*n*, 28*s*, 30*n*, 30*s* may be set to be wound around the respective core element 54, 56 before connecting the core elements 54, 55 to each other by a connection pin 86 or after connecting the core elements 54, 56 to each other by a connection pin 86 and before assembled to the shaft 25.

In the example shown in FIGS. 7 and 8, the diagonally projecting portions 78 of the first and second core elements 54, 56 adjacent in the circumferential direction are connected to each other by the connection pin 86. Specifically, as the diagonally projecting portion 78 of the first core element 54 and the diagonally projecting portion 78 of the second core element 56 are displaced from each other in the axial direction, if is possible to arrange the diagonally projecting portions 78 in an annular shape without interference when the core elements 54, 56 are arranged in an annular shape.

Accordingly, by inserting or pressing the connection pin 86 into the pin hole 85 with the pin holes 85 of the diagonally projecting portion 78 of the first core element 54 and of the diagonally projecting portion 78 of the second core element 56 aligned in the axial direction, it is possible to have the first and second core elements 54, 56 arranged in an annular shape in a connected state.

In the above, if a magnetic flux path including an axial path should be formed via the auxiliary salient pole 42 constituted by the diagonally projecting portion 78 and the connection pin 86, a torque output will drop due to magnetic flux leakage. To address the above, it is preferable to form a space in the axial direction between the auxiliary salient pole 42 (that is, the diagonally projecting portion 78) of the first core element 54 and the auxiliary salient pole 42 (that is, the diagonally projecting portion 78) of the second core element 56, and/or to use a connection pin 86 made of non-magnetic material, such as stainless steel or the like, for example.

The shaft 25 is inserted or pressure-inserted in the axial direction to be assembled such that the outside convex portions 46 of the shaft 25 are fitted into the inside concave portions 70 of the first and second core elements 54, 56 connected in an annular shape as described above. Then, as shown in FIG. 8, a plurality of backlash reducing pins 88 are inserted or pressed into the plurality of respective pin insertion portions 87 in the axial direction such that the rotor-side root portions 62 of the adjacent core elements 54, 56 are pressed away from each other. With the above, as the adjacent core elements 54, 56 in the circumferential direction are closely adhered to each other in the circumferential direction in the rotor-side root portions 62 thereof positioned on a side for connection to the shaft 25, it is possible to reduce backlash between the adjacent core elements 54, 56.

In the rotor 14 in this embodiment, as the plurality of core elements 54, 56 placed at a plurality of respective positions in the circumferential direction remain contacting each other in the rotor-side root portions 62 thereof, a magnetic path in which many magnetic fluxes generated in the stator 12 run does not run in the shaft 25. This makes it possible to prevent increase of magnetic resistance and also to improve performance of the rotating electric machine 10.

In the above, a rotor structure is described in which the inductance coils 28*n*, 28*s* and the common coils 30*n*, 30*s* are wound around the N-pole formed salient pole 32*n* and the S-pole formed salient pole 32*s*, respectively, and the induction coils 28*n*, 28*s* and the common coils 30*n*, 30*s* of the adjacent salient poles 32*n*, 32*s* in the circumferential direction are respectively connected to each other via two diodes 38, 40. However, the rotating electric machine according to the present invention is not limited to this structure. For example, like the rotor 14*a* shown in FIG. 9, a structure is applicable in which a coil 30 is independently wound around each salient pole 32*n*, 32*s*, and the diode 33 or 40 is serially connected to each coil 30. In this case, the above described auxiliary salient pole 42 may not be formed on each salient pole 32*n*, 32*s*.

Figure 9:
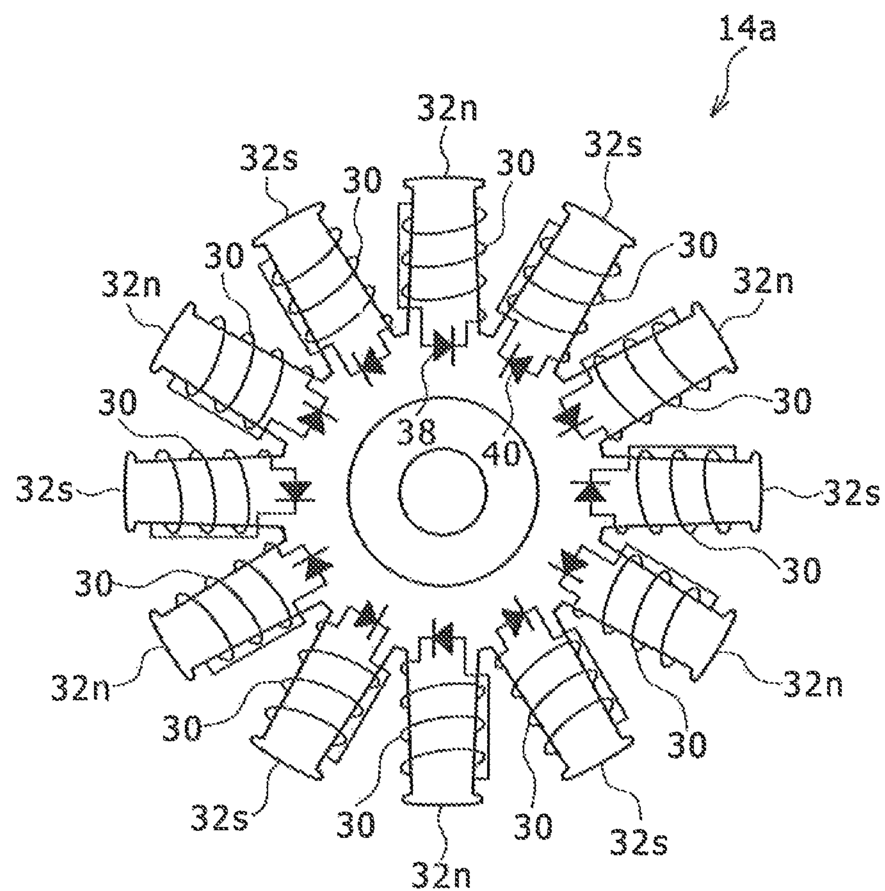
FIG. 9 shows a modified example in which diodes are connected to the respective rotor coils wound around the respective salient poles of the rotor.
Figure 10:
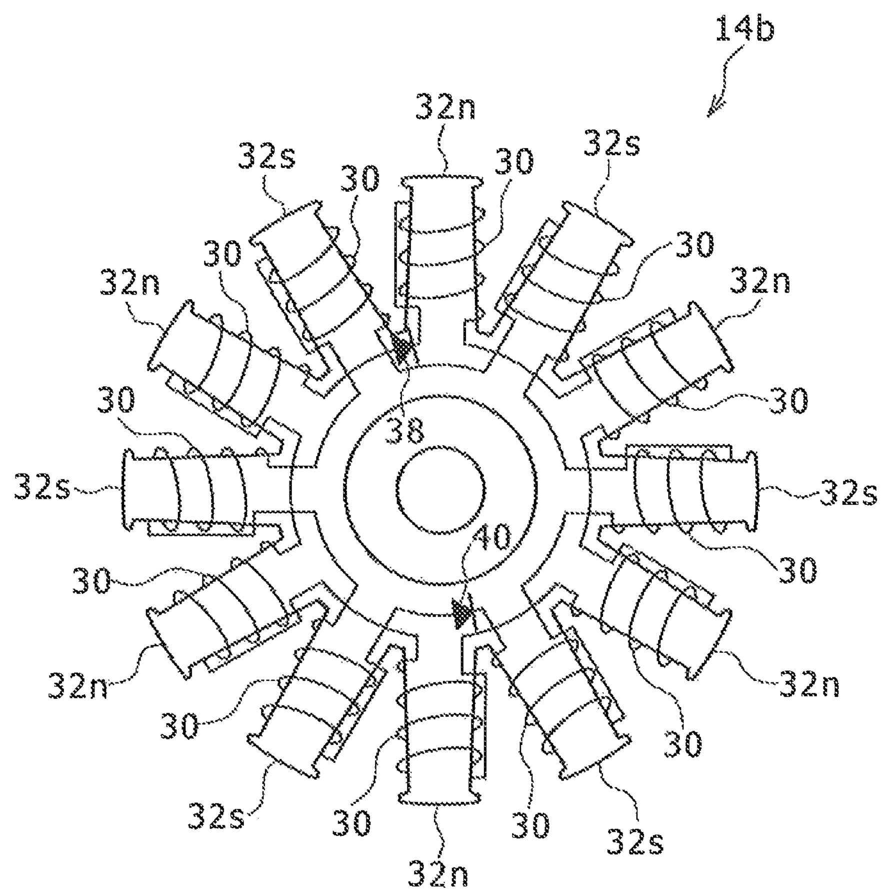
FIG. 10 shows an example in which the rotor coil is connected to fewer diodes, and is a drawing corresponding to FIG. 9.

Further, like the rotor 14*b* as shown in FIG. 10, the number of diodes in use may be reduced, compared to the rotor structure shown in FIG. 9. In detail, although the rotor 14*b* is the same in that a coil 30 is independently wound around each of the N-pole formed salient pole 32*n* and the S-pole formed salient pole 32*s*, every other coil 30 in the circumferential direction may be serially connected to each other and then connected to one diode 38, and the remaining coils 30 are serially connected to each other and then connected to another diode 40 having a forward direction opposite to that of the above mentioned, diode 38. With the above, it is possible to reduce the number of diodes in use to two from the number corresponding to the salient poles 32*n* and 32*s*.

Further, the rotor 14*a*, 14*b* shown in FIGS. 9 and 10 may be formed by cutting electromagnetic steel sheets into an annular shape through stamping, then stacking in the axial direction, and connecting by means of caulking, welding, or the like, for integration, rather than by connecting a plurality of separate core elements 54, 56 in the circumferential direction. In this case, the position in the circumferential direction of the rotor core fixed to the shaft can be determined through key fitting, pressure insertion, tight fitting, or the like.

In the following, a mounting structure and a cooling structure for the diodes will be described, referring to FIGS. 11 to 19 in addition to FIG. 1.

Figure 11:
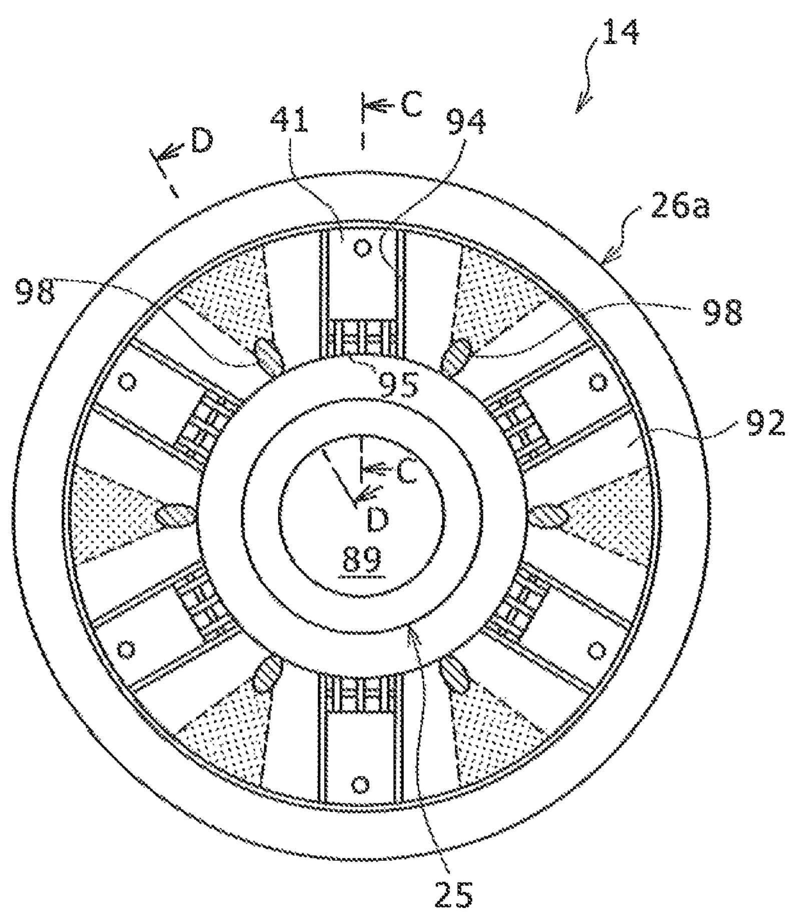
FIG. 11 shows an example of an end surface of the rotor in the axial direction.
Figure 12:
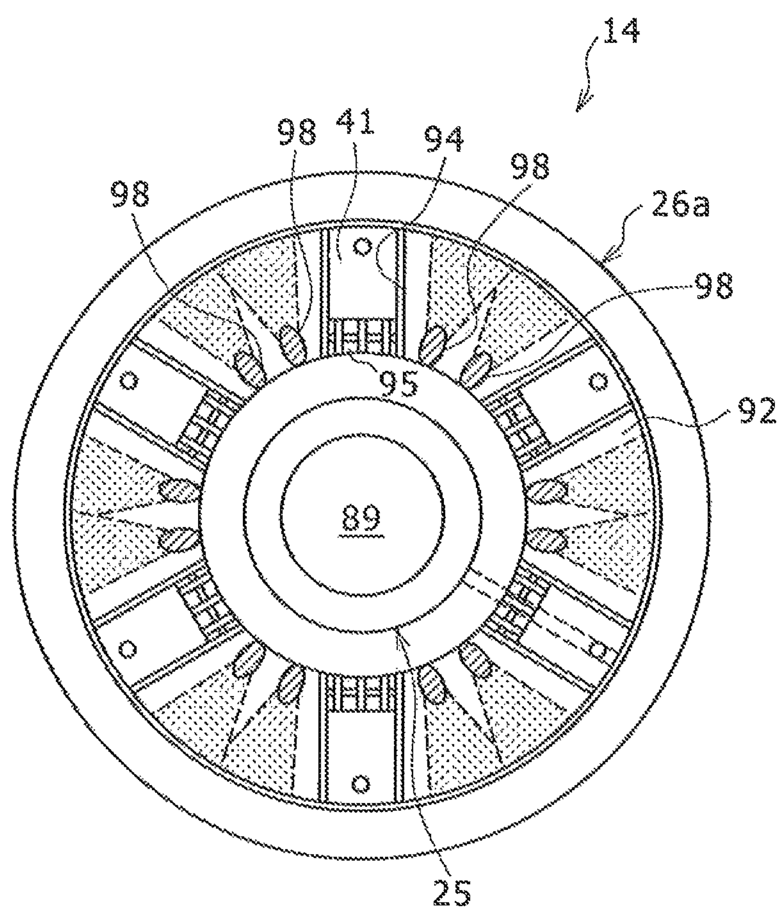
FIG. 12 shows another example of the end surface of the rotor in the axial direction.
Figure 13:
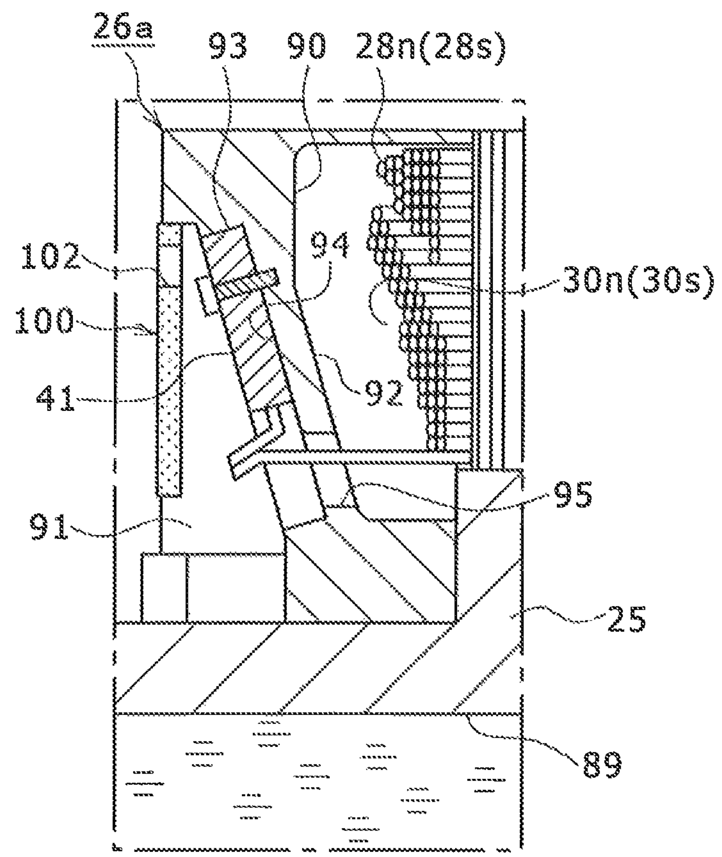
FIG. 13 is a cross sectional view along the line C-C FIG. 11.
Figure 14:
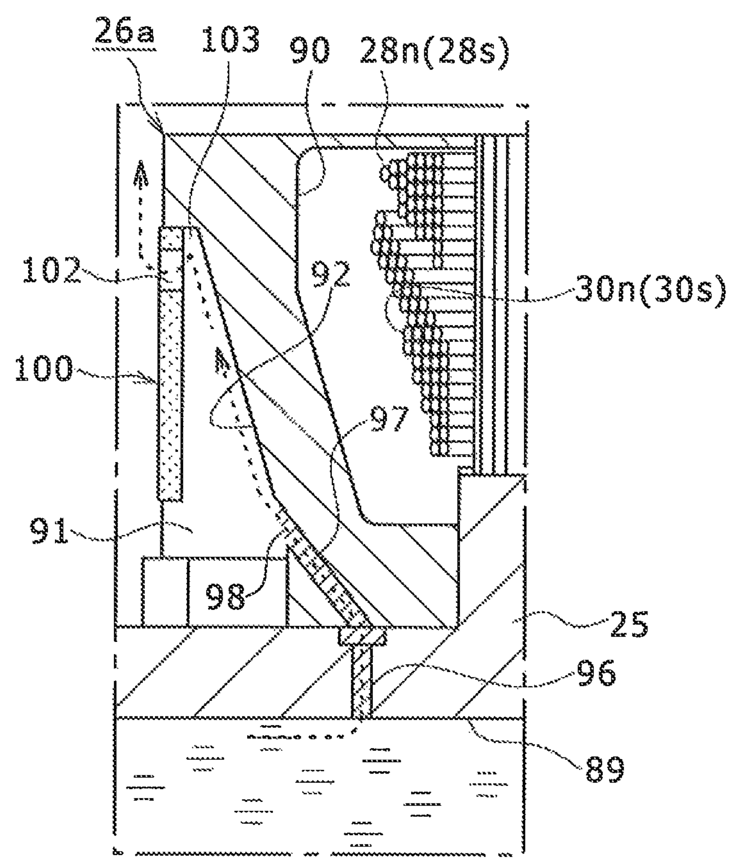
FIG. 14 is a cross sectional view along the line D-D in FIG. 11.

FIG. 11 shows the end plate 26*a* provided to the rotor 14, viewed from the outside in the axial direction. FIG. 12 shows an example including a different number of coolant discharge outlets from that in FIG. 10. FIG. 13 is a cross sectional view along the line C-C in FIG. 11. FIG. 14 is a cross sectional view along the line D-D in FIG. 11. In the description below, a side closer to the rotor core 24 is referred to as an “inside in the axial direction”, and a side farther from the rotor core 24 is referred to as an “outside in the axial direction”, which is similarly applied throughout the specification and claims of this application.

As shown in FIG. 1, the rotor 14 has the shaft 25 rotatably supported on the respective two end sides thereof, the rotor core 24 fitted and fixed around the shaft 25 by means of caulking, thermal insertion, pressure insertion, or the like, and the end plates 26*a*, 26*b* placed on the respective two sides of the rotor core 24 in the axial direction. The induction coils 28*n*, 28*s* and the common coils 30*n*, 30*s* are wound around the rotor core 24, as described above. The end plates 26*a*, 26*b* abut on the respective two sides of the rotor core 24 in the axial direction, thereby constituting the end portions in the axial direction of the rotor 14 that defines a cylindrical shape excluding the shaft 25.

A coolant path 89 is formed in the shaft 25 so as to extend in the axial direction. Cooling oil, or an example of liquid coolant, is supplied for circulation into the coolant path 89 via an oil pump, an oil cooler, or the like.

An inside concave portion 90 is formed in the inside of each end plate 26*a*, 26*b* in the axial direction for avoiding the coil ends of the coils 28*n*, 28*s*, 30*n*, 30*s*, that project more outward in the axial direction beyond the respective end portions of the rotor core 24. Further, an outside concave portion 91 including a substantially conical space is formed outside each end plate 26*a*, 26*b* in the axial direction. Each end plate 26*a*, 26*b* is made of non-magnetic material, and the inside end portions thereof in the axial direction abut on the rotor core 24 in the outer circumferential end portion and the inner circumferential end portion of the end plates 26*a*, 26*b*, respectively.

For example, the inside end portion in the axial direction of the outer circumferential portion of each end plate 26*a*, 26*b* can abut on the end portion in the axial direction of the connection portion of each auxiliary salient poles 42. In this case, a concave portion may be formed on the inside end portion in the axial direction of the outer circumferential portion of each end plate 26*a*, 26*b* for receiving and holding the end portion of each connection pin 86 that projects in the axial direction beyond the rotor core 24.

The end plates 26*a*, 26*b* may be simply in contact with the rotor core 24 or the like, or sandwich the rotor core 24 or the like from the respective two sides of the rotor core 24 in the axial direction. Alternatively, the end plate 26*a*, 26*b* may be a simple annular plate provided apart from the rotor core 24 outward in the axial direction.

In each end plate 26*a*, 26*b*, the inside concave portion 90 and the outside concave portion 91 are separated from each other by an end wall portion 92 that is substantially opposed in the axial direction. The end wall portion 92 is formed inclined so as to be positioned more outward in the axial direction as it goes outward in the radial direction, as described above. The outer surface of the end wall portion 92 constitutes the end surface of the rotor 14 in the axial direction.

In the rotor 14 in this embodiment, diode devices 41 (an electronic device) integrally including a pair of first and second diodes 38, 40 respectively are mounted on one of the two end plates 26*a*, 26*b*, namely, the end plate 26*a*. In more detail, a plurality of mounting slots 94 each having an abutment wall portion on the outer circumferential portion are formed on the outer circumferential surface of the end wall portion 92 of the end plate 26*a* at an interval in the circumferential direction so as to extend radially. An opening 95 for electric connection between the respective coils 28*n*, 28*s*, 30*n*, 30*s* and the diode device 41 is formed on the inner circumferential side of each mounting slot 94, so that the inside concave portion 90 and the outside concave portion 91 are communicated with each other via the opening 95.

The diode device 41 is fitted and placed in the mounting slot 94 and fixed by a screw or the like, for example, while abutting on the abutment wall portion 93 in a position outside in the radial direction. In this embodiment, six mounting slots 94 are formed, and a diode device 41 is placed in each mounting slot 94. As the diode device 41 is provided contacting the abutment wall portion 93 in a position outside in the radial direction, it is possible to reliably hold or support the diode device 41 against a centrifugal force that acts on while the rotor 14 is rotating Although it is described in this embodiment that all diode devices 41 are mounted on one end plate 26*a*, this is not limiting, and the diode devices 41 may be shared to also be mounted on the other end plate 26*b*. Specifically, three out of the six diode devices 41 shown in FIG. 11 may be mounted on the other end plate 26*b*.

The first and second diodes 38, 40 individually packaged may be used. In this case, for example, the first diode 38 may be mounted on the end plate 26*a*, and the second diode 40 may be mounted on the other end plate 26*b*.

The first and second diodes 38, 40 may be mounted on the inner surface in the axial direction of the end wall portion 92 of the end plate 26*a*. In this case, the opening 95 on the end plate 26*a* is unnecessary, which can produce an advantage of simplifying work on the end plate. In this case, it is preferable that the end wall portion 92 of the end plate 26*a* be formed inclined inward in the axial direction, so that the cooling oil can flow more readily on the inner surface of the end wall portion 92. Further, in this case, an advantage can be produced that a cover member 100 to be described later, provided to prevent the cooling oil from changing into mist due to wind pressure caused by the rotor rotating, is unnecessary.

Still further, when the end place is a simple annular plate provided apart from the rotor core 24 outward in the axial direction, a diode device or a rectifier may be mounted on the surface of the plate opposed to the rotor core.

As shown in FIG. 11, each diode device 41 has three terminals, in which two outside terminals of the three are connected to the respective end portions of the induction coils 28*n*, 28*s*, and the middle terminal is connected to the end portion of the common coil 30*n* (see FIG. 5). The respective end portions of the induction coils 28*n*, 28*s* and of the common coil 30*n* connected to the diode device 41 extend from the inner circumferential side of the common coil 30*n* (30*s*) to the outside in the axial direction, and project via the opening 95 of the end plate 26*a* to be connected to the terminal of the diode device 41 by means of welding, caulking, or the like. Note that FIG. 13 shows a situation in which one terminal is connected to a coil end portion.

Referring to FIG. 11 and FIG. 13, a plurality of coolant discharge outlets 98 are formed penetrating in the end wall portion 92 of the end plate 26*a*. The coolant discharge outlet 98 is formed between the diode devices 41 in the circumferential direction at a position closer to the inner radial side. As the coolant discharge outlet 98 is positioned as such, the cooling oil discharged from the coolant discharge outlet 98 spreads into a substantially fan shape, as indicated by the broken line in the drawing, due to a centrifugal force by the rotating rotor 14 to flow outward in the radial direction, but is prevented from directly touching the diode device 41. This can prevent deficiencies, such as abrasion or the like, caused by the cooling oil flowing outward in the radial direction at a high speed due to a centrifugal force and touching or bumping into the diode device 41.

Note that although an example is described, referring to FIG. 11, in which one coolant discharge outlet 98 is formed between the diode devices 41, this is not limiting. For example, as shown in FIG. 12, two coolant discharge outlets 98 may be formed between the diode devices 41. When a plurality of coolant discharge outlets 98 are formed between the diode devices 41, as described above, it is possible to increase the amount of cooling oil to be supplied to thereby enlarge the area on the end wall portion 92 where the cooling oil flows, and resultantly, to improve cooling performance of indirectly cooling the diode device 41 via the end plate 26*a* by the cooling oil.

As shown in FIG. 14, a plurality of coolant supply paths (a first coolant supply path) 96 are formed in the shaft 25, arranged in the circumferential direction at an interval so as to extend in the radial direction. The coolant supply path 96 is a path for supplying the cooling oil flowing in the coolant path 89 in the shaft to the outside of the shaft. The outside end portion of the coolant supply path 96 is spot faced to be wider on the surface of the shaft 25, which makes it easier to position relative to another coolant supply path (a second coolant supply path) formed on the end plate 26*a*.

Note that although it is described here that the second coolant supply path is formed in the end plate, this is not limiting, and the space or the like left between the end plate and the rotor core, for example, may constitute the second coolant supply path.

Another coolant supply path 97 communicating with the coolant supply path 96 of the shaft 25 is formed in the end plate 26*a* so as to penetrate. The coolant supply path 97 is connected to the coolant discharge outlet 98 that is open on the end wall portion 92. In other words, the end portion itself of the coolant supply path 97 that is open on the end wall portion 92 makes the coolant discharge outlet 98.

As shown in FIGS. 13 and 14, the cover member 100 may be provided to the end plate 26*a* so as to cover at least the outer circumferential portion of the outside concave portion 91. The cover member 100 can be preferably made using an annular plate. A coolant discharge outlet 102 is formed in the outer circumferential portion of the cover member 100. The coolant discharge outlet 102 has a function for regulating the amount of cooling oil pooled in a coolant sump 103, or a spatial area defined between the cover member 100 and the end plate 26*a* and positioned outside in the radial direction.

In more detail, when the coolant discharge outlet 102 is formed at a position much closer to the outer circumference, a smaller amount of oil is pooled in the coolant sump 103, while when the coolant discharge outlet 102 is formed at a position much closer to the inter circumference, a larger amount of oil is pooled in the coolant sump 103. Therefore, the formation position, size, and shape of the coolant discharge outlet 102 may be desirably set such that a desired amount of cooling oil is discharged from the coolant discharge outlet 98 and flows outward in the radial direction due to a centrifugal force so that preferable cooling performance can be obtained.

Further, the cover member 100 also has a function for preventing the cooling oil discharged from the coolant opening 95 from changing into mist. In more detail, as the coolant discharge outlet 98 is formed on the end plate 26*a* at a position farther from the end surface thereof in the axial direction inward in the axial direction (that is, on the bottom portion of the outside concave portion 91 or nearby), and the cover member 100 is provided substantially covering the outside concave portion 91 of the end plate 26*a*, it is possible to prevent the coolant discharge outlet 98 from being exposed to the surrounding air due to high speed rotation of the rotor 14. As a result, it is possible to have the cooling oil flow reliably in a liquid state outward in the radial direction along the surface of the end wall portion 92 of the end plate 26*a*.

In the rotating electric machine 10 having the rotor 14 employing the above described cooling structure that uses oil supplied from the shaft, cooling oil is supplied to the coolant path 89 in the shaft 25 positioned inside in the radial direction relative to the diode device 41 mounted on the rotor 14, and further to the outside of the shaft via the coolant supply paths 96, 97 due to a centrifugal force, as well as oil pressure in a case where the cooling oil is fed by pressure, before being flown from the coolant discharge outlet 98. The cooling oil discharged from the coolant discharge outlet 98 flows outward in the radial direction, while spreading in the circumferential direction along a substantially fan-shaped surface area on the end wall portion 92 positioned between the diode devices 41.

Meanwhile, the diode device 41 including the first and second diodes 38, 40 generates heat as an induced current generated by the induction coils 28*n*, 28*s* flows. The generated heat is transmitted via a bottom surface (that is, a surface in contact with the bottom surface of the mounting slot 94) of the diode device 41 to the end plate 26*a*, and then removed by the cooling oil flowing on the outer surface of the end wall portion 92, as described above. That is, the diode device 41 is indirectly cooled by the cooling oil via the end plate 26*a*.

In the end plate 26*a* in this embodiment, the outer surface of the end wall portion 92 continuing to the coolant discharge outlet 98 is inclined relative to the radial direction so as to be positioned more outward in the axial direction as it goes outward in the radial direction. With the above, when the cooling oil discharged from the coolant discharge outlet 98 flows on the outer surface of the end wall portion 92, a pressing force for pressing onto the outer surface will act on the cooling oil as a divided force of the centrifugal force caused by the rotating rotor. With the pressing force acting on it, the cooling oil can remain in a liquid state, without being changed into mist, while flowing outward in the radial direction on the outer surface of the end wall portion 92. As a result, it is possible to obtain sufficient cooling performance for the diode device 41.

The cooling oil having flown outward in the radial direction on the outer surface of the end wall portion 92 is temporarily pooled in the coolant sump 103. The cooling oil removes heat from the end plate 26*a*, even while being pooled, to thereby indirectly cool the diode device 41. Thereafter, the cooling oil overflown from the coolant sump 103 is discharged from the coolant discharge outlet 102 to the outside of the rotor 14. Then, the cooling oil is discharged from the bottom of a case for accommodating the rotating electric machine 10, and after passing through an oil cooler to discharge heat and lower the temperature, is supplied for circulation to the coolant path 89 in the shaft 25 by an action or an oil pump or the like.

As described above, according to the rotating electric machine 10 in this embodiment, cooling oil from the coolant path 89 of the shaft 25 positioned inside in the radial direction relative to the diode device 41 mounted on the end plate 26*a* is discharged from the coolant discharge outlet 98 of the end plate 26*a* via the coolant supply paths 96, 97 due to a centrifugal force or the like of the rotating rotor 14, and flows outward in the radial direction on the outer surface of the end wall portion 92 of the end plate 26*a* to be supplied to around the diode device 41. With the above, it is possible to sufficiently cool the diode device 41 that generates heat upon application of electricity, via the end plate 26*a* having preferable heat conductivity.

As this embodiment has such an arrangement that cooling oil is supplied to between the diode devices 41 in the circumferential direction, the diode device 41 can be mounted at a position closer to the inner circumference, compared to an arrangement in which the coolant discharge outlet 98 is formed on the inner circumference side of the diode device 41. Therefore, it is possible to prevent the centrifugal force that acts on the diode device 41 (that is, the first and second diodes 38, 40) due to the rotating rotor 14, which makes it possible to reduce the weight of a support portion (corresponding to the abutment wall portion 93 in this embodiment), which abuts on the diode at a position outside in the radial direction, against a centrifugal force and to prevent failure of an electronic device.

In the following, an example including a different structure for cooling the diode device mounted on the rotor by cooling oil is described referring to FIGS. 15 to 19. A structure different from that in the above-described embodiment is mainly described here, and structures identical to those in the above are given the same reference numerals and not described again.

Figure 15:
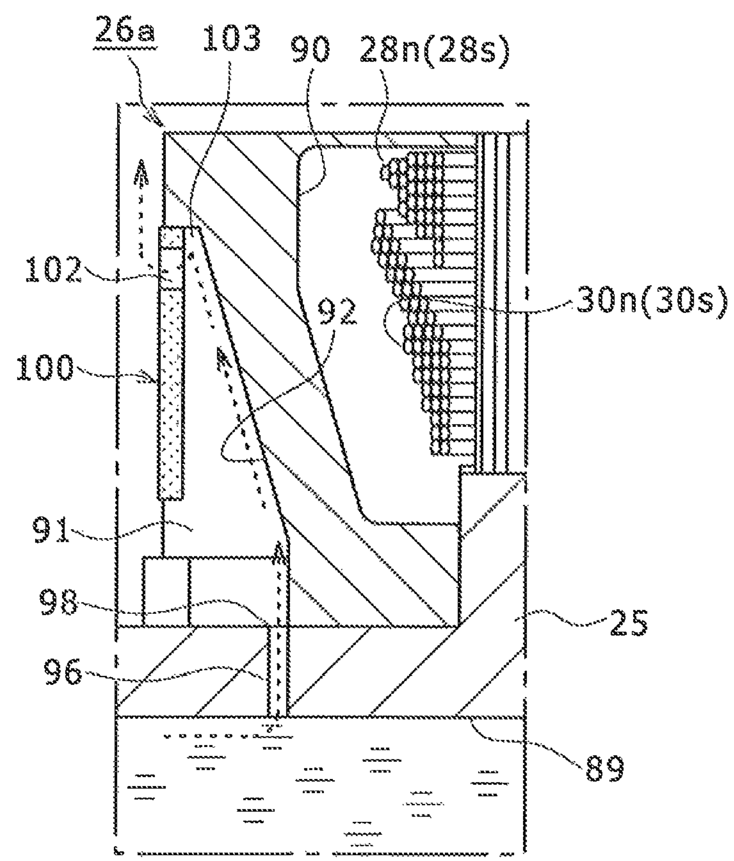
FIG. 15 shows another example in which a coolant discharge outlet is formed in a shaft, and is a drawing corresponding to FIG. 14.

FIG. 15 shows another example in which a coolant discharge outlet is formed on the shaft, and is a drawing corresponding to FIG. 14. In the example shown in FIG. 15, the position where the coolant supply path 96 is formed on the shaft 25 is different. That is, the coolant discharge outlet 98, or an end portion of the coolant supply path 96, is formed open on the surface of the shaft 25. With the above, it is possible to supply the cooling oil discharged from the coolant supply path 96 directly onto the outer surface of the end wall portion 92 of the end plate 26*a* (that is, not via the coolant supply path in the end plate), which can produce an advantage of omitting labor and working cost for providing a coolant supply path and a coolant discharge outlet in the end plate. In this case, it is preferable to have the coolant discharge outlet 98 substantially flush with the bottom portion of the outside concave portion 91 of the end plate 26*a* so that the cooling oil discharged from the coolant discharge outlet 98 on the shaft 25 flows smoothly without splashing.

Figure 16:
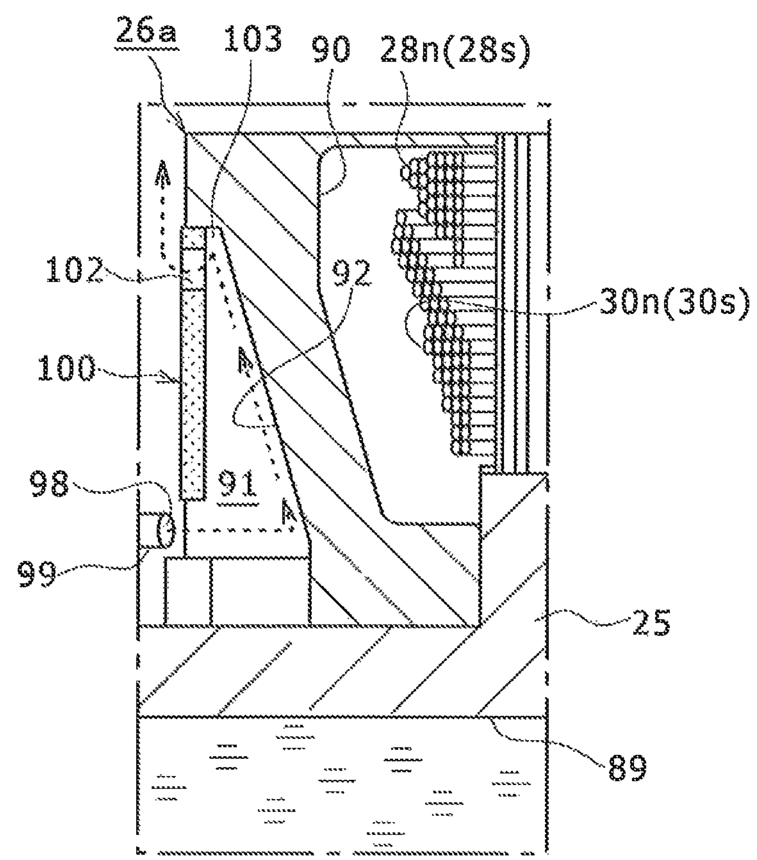
FIG. 16 shows still another example in which a coolant discharge outlet is formed outside the rotor, and is a drawing corresponding to FIG. 14

FIG. 16 shows still another example in which a coolant discharge outlet is formed outside the rotor, and is a drawing corresponding to FIG. 14. In this example, cooling oil is supplied from the outside of the rotor 14 into the outside concave portion 91 of the end plate 26*a*. Specifically, a coolant supply pipe 99 extending from a non-rotating portion, such as a case (not shown) or the like, for accommodating the rotating electric machine 10 is provided near the end plate 26*a* of the rotor 14, and the cooling oil is poured into the outside concave portion 91 of the end plate 26*a* from the coolant discharge outlet 98 on the tip end portion of the coolant supply pipe 99. In this case, it is preferable for the position where the cooling oil is supplied to the end plate 26*a* to be closer to the inner circumference than the diode device 41 mounted on the end plate 26*a*. With the above, it is possible to have the cooling oil supplied from the outside of the rotor to the end plate 26*a* to flow outward in the radial direction due to an action of a centrifugal force, whereby the diode device 41 is preferably cooled via the end plate 26*a*. Further, in this case, as it is unnecessary to supply the cooling oil from the shaft 25, an advantage can be produced that labor and working cost for forming a coolant channel, a coolant supply path, a coolant discharge outlet, and the like, in the shaft 25 can be omitted.

Figure 17:
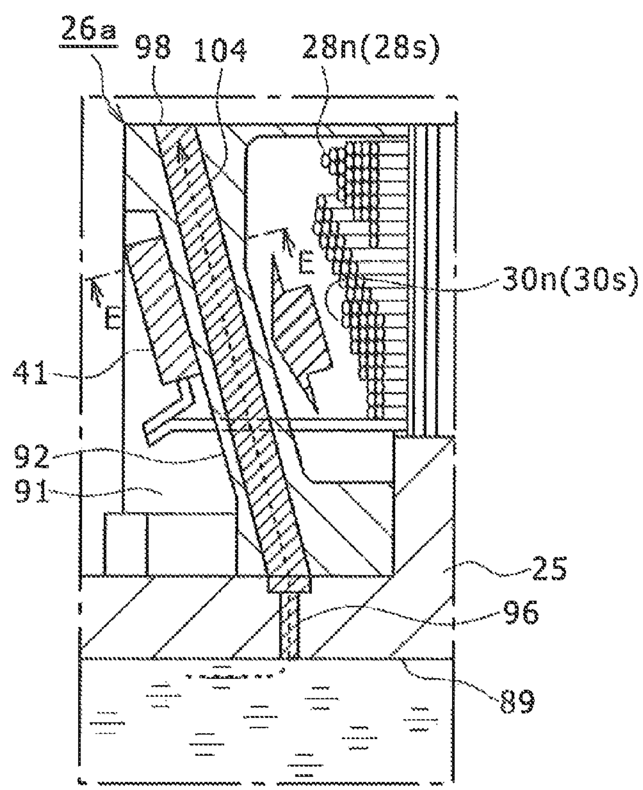
FIG. 17 shows still another example in which a coolant path is formed in an end plate, and is a drawing corresponding to FIG. 14.
Figure 18:
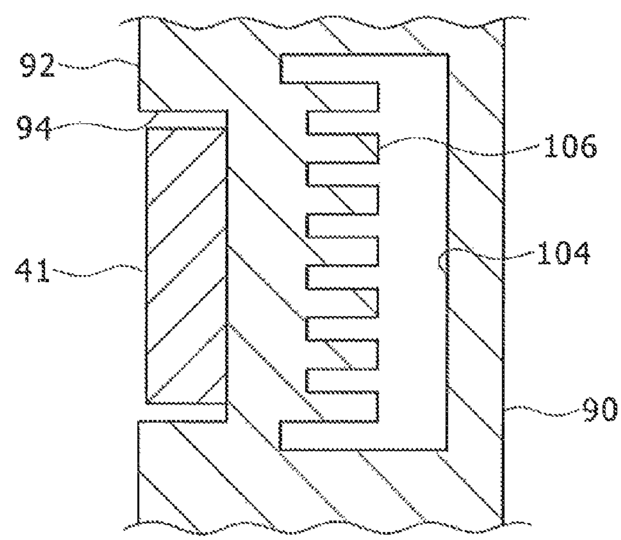
FIG. 18 is a cross sectional view along the line E-E in FIG. 17.

FIG. 17 shows still another example of a structure in which a coolant path is formed in the end plate 26*a*, and is a drawing corresponding to FIG. 14. FIG. 18 is a cross sectional view along the line E-E in FIG. 17. Note that no cover member is provided on the end surface of the end plate 26*a* here.

In this example, a coolant path 104 is formed extending in the end wall portion 92 of the end plate 26*a*. The inside end portion of the coolant path 104 in the radial direction communicates with the coolant supply path 96 formed in the shaft 25, while the outside end portion of the coolant path 104 in the radial direction is open on the outer circumferential surface of the end plate 26*a*, constituting the coolant discharge outlet 98. Therefore, the coolant path 104 formed in the end plate 26*a* is positioned between the diode device 41 mounted on the outer surface of the end wall portion 92 and the coils 28*n*, 28*s*, 30*n*, 30*s* opposed to the inner surface of the end wall portion 92 in the axial direction.

With the coolant path 104 formed between the diode device 41 and the coils 28*n*, 28*s*, 30*n*, 30*s*, as described above, it is possible to cool both the diode device 41 and the coils 28*n*, 28*s*, 30*n*, 30*s* with the cooling oil supplied from the coolant path 89 and the coolant supply path 96 of the shaft 25 and flowing in the coolant path 104.

In more detail, it is often a case that the coils 28*n*, 28*s*, 30*n*, 30*s* generate a larger amount of heat than the diode device 41, and cooling capability of the cooling oil passing in the cooling path 104 may turn out to be excessive for the diode device 41. In such a case, with an arrangement in which the coils 28*n*, 28*s*, 30*n*, 30*s* can also be cooled by the excessive cooling capability, it is possible to ensure cooling performance with respect to the coils 28*n*, 28*s*, 30*n*, 30*s*.

In this example, as shown in FIG. 18, a heat discharge fin 106 may be provided at a position on the inside wall surface of the coolant path 104, the position corresponding to the diode device 41. With the above, it is possible to efficiently discharge the heat transmitted from the diode device 41 to the end wall portion 92, from the heat discharge fin 106 to the cooling oil in the coolant path 104. This improves cooling performance with respect to the diode device 41.

Note that the coolant path 104 may be positioned displaced in the circumferential direction relative to the diode device 41 when viewed from the axial direction, as long as the coolant path 104 is positioned between the diode device 41 and the coils 28*n*, 28*s*, 30*n*, 30*s* in the axial direction.

Figure 19:
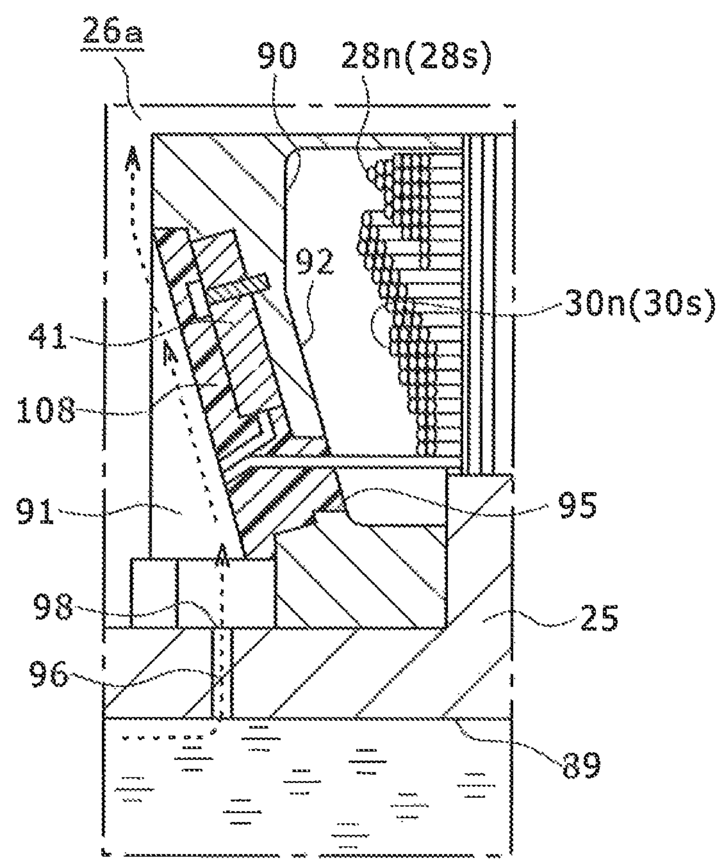
FIG. 19 shows an example in which an electronic device is covered by mold resin and coolant is supplied to the top of the mold resin, and is a drawing corresponding to FIG. 13.

FIG. 19 shows an example in which an electronic device is covered by mold resin, and coolant is supplied to the top of the mold resin, and is a drawing corresponding to FIG. 13. Although the cover member 100 is not shown here either, the cover member 100 having a function such as is described referring to FIG. 14 may be provided.

In this example, the diode device 41 mounted on the end plate 26*a* is covered by a mold resin portion 108. The mold resin portion 108 is also filled around a connection portion of the terminal of the diode device 41 and the end portions of the coils 28*n*, 28*s*, 30*n*, 30*s*, whereby the diode terminal and the coil end portion connected to each other by means of welding, caulking, or the like, are reliably fixed without positional variation. This can effectively prevent connection failure due to separation of the diode terminal and the coil end portion.

The mold resin portion 108 does not necessarily cover the entire outer surface of the end wall portion 92 as long as it is formed so as to prevent exposure of at least the diode device 41. For example, the mold resin portion 108 may have so small a width that it covers the mounting slot 94 for mounting the diode device 41 (see FIG. 11).

In the above described manner, even when the coolant discharge outlet 98 is formed on the shaft 25 positioned inside in the radial direction relative to the diode device 41, it is possible to sufficiently cool the diode device 41 as the cooling oil discharged from the coolant discharge outlet 98 flows on the mold resin portion 108 covering the diode device 41. Moreover, it is possible to prevent deficiencies, such as abrasion or deterioration, caused by the cooling oil flowing outward in the radial direction at a high speed due to a centrifugal force and touching or bumping into the diode device 41 as the cooling oil does not directly touch the diode device 41. Further, in also this example, similar to the example shown in FIG. 11, as the coolant discharge outlet 98 is formed between the diode devices 41 in the circumferential direction to supply cooling oil, it is possible to indirectly cool the diode device 41 via the end wall portion 92. This can be expected to further improve cooling performance.

Although an embodiment of the present invention and modified examples thereof are described in the above, a rotating electric machine according to the present invention is not limited to the above described structures, and various modifications and improvements are possible.

For example, the coil end portions of the coils 28*n*, 28*s*, 30*n*, 30*s* wound around the rotor core 24 may be covered by mold resin, and the mold resin may be substantially filled in the inside concave portion 90 of the end plate 26*a* when the end plate 26*a* is assembled to the rotor core 24. With the above, heat transmission from the coils 28*n*, 28*s*, 30*n*, 30*s* to the end plate 26*a* via the mold resin having higher thermal conductive rate than air is accelerated, which can improve cooling performance with respect to the coils 28*n*, 28*s*, 30*n*, 30*s*. In this case, filling the mold resin in the inside concave portion 90 via the opening 95 of the end wall portion 92 at the same time as formation of the mold resin portion 108 shown in FIG. 19 makes it possible to reduce the number of molding steps and thus the number of manufacturing steps and costs.

Although a structure is described in the above embodiment in which the diode device 41 is mounted on the end plate 26*a* and is cooled by the cooling oil supplied from the coolant path 89 of the shaft 25, this is not limiting. For example, a structure may be applicable in which a mold resin portion for covering the coils 28*n*, 28*s*, 30*n*, 30*s* wound around the rotor core 24 is provided, a diode device is fixed on or in the mold resin portion, and liquid coolant supplied from the shaft or a non-rotating portion is supplied toward the mold resin portion, to thereby cool the diode device and, if necessary, cool the coils.

Although the diode device 41 is mounted on the end plate 26*a* by a screw or the like in the above described embodiment, a diode device or a rectifier may be directly mounted on at least either the shaft or the rotor core, or on a plate member fixed to the shaft at an interval in the axial direction relative to the rotor core or the like.

Although it is described in the above described embodiment that a diode device or a rectifier that is a separate member is mounted on the end plate provided to the end portion of the rotor core by a screw or the like, this is not limiting. For example, a diode device made of a semiconductor device and integrally formed with or built in the end plate may be used.

DESCRIPTION OF REFERENCE NUMERALS

10 rotating electric machine, 12 stator, 14, 14*a*, 14*b* rotor, 16 stator core, 18 teeth, 20*u*, 20*v*, 20*w* stator coil, 22 slot, 24 rotor core, 25 shaft, 26*a*, 26*b* end plate, 28*n* N-pole induction coil, 28*s* S-pole induction coil, 30*n* N-pole common coil, 30*s* S-pole common coil, 32*n* N-pole formed salient pole, 32*s* S-pole formed salient pole, 33 rotor yoke, 34 slot, 36 common coil pair, 38 first diode, 40 second diode, 41 diode device, 42 auxiliary salient pole, 44 brim portion, 46 outside convex portion, 48 shaft-side root portion, 50 shaft-side tip end portion, 52 maximum width portion, 54 first core element, 56 second core element, 62 rotor-side root portion, 64 rotor-side tip end portion, 30 inside concave portion, 72 wider portion, 74 half round portion, 78 diagonally projecting portion, 80 circumferential projecting portion, 85 pin slot, 86 connection pin, 87 pin insertion portion, 88 backlash reducing pin, 89 coolant channel, 90 inside concave portion, 91 outside concave portion, 92 end wall portion, 93 abutment wall portion, 94 mounting slot, 95 opening, 96, 97 coolant supply path, 98 coolant discharge outlet, 100 cover member, 102 coolant discharge slot, 103 coolant sump, 104 coolant path, 106 heat discharge fin.

The invention claimed is:

1. A rotating electric machine, comprising:

a stator for generating a rotating magnetic field;

a rotatable rotor placed opposed to the stator;

an electronic device mounted on an end plate that constitutes an end surface of the rotor in an axial direction and connected to a coil wound around the rotor, for rotating together with the rotor; and a cooling structure for cooling heat generated in the electronic device with liquid coolant supplied from inside in a radial direction relative to the electronic device via the end plate.

2. The rotating electric machine according to claim 1, wherein the cooling structure has a coolant path formed in a shaft for rotatably supporting the rotor and a coolant supply path for supplying the liquid coolant flowing in the coolant path to outside of the shaft.

3. The rotating electric machine according to claim 2, wherein the electronic device includes a plurality of electronic devices placed on the end surface of the rotor in the axial direction at intervals in a circumferential direction, and an end portion of the coolant supply path is open between the electronic devices in the circumferential direction.

4. The rotating electric machine according to claim 3, wherein the coolant supply path includes a first coolant supply path formed in the shaft and a second coolant supply path formed in the end plate, in which an end portion of the second coolant supply path is open on a surface of the end plate.

5. The rotating electric machine according to claim 4, wherein the surface of the end plate onto which the liquid coolant is supplied from the coolant supply path is inclined outward in the axial direction relative to the radial direction.

6. The rotating electric machine according to claim 2, wherein the coolant supply path is formed in the shaft to supply the liquid coolant from the coolant path to outside of the shaft, in which an end portion of the coolant supply path is open on a surface of the end plate.

7. The rotating electric machine according to claim 2, wherein the coolant supply path continues to an outer circumferential surface of the end plate at a position between the electronic device and the coil via a path formed in the end plate.

8. The rotating electric machine according to claim 7, wherein a heat discharge fin is formed on an inside wall surface of the path on a back surface side of the electronic device.

9. The rotating electric machine according to claim 2, wherein an opening on an end portion of the coolant supply path is positioned apart from an end surface of the end plate in the axial direction inward in the axial direction, and a cover member for covering at least an outer circumferential portion is provided on the end surface of the end plate in the axial direction.

10. The rotating electric machine according to claim 9, wherein a coolant discharge slot for determining an amount of coolant pooled in a coolant sump for pooling the liquid coolant discharged from a coolant outlet and flowing outward in the radial direction is formed on an outer circumferential portion of the cover member.

* * * * *